US009235317B2

(12) United States Patent
Matas et al.

(10) Patent No.: US 9,235,317 B2
(45) Date of Patent: Jan. 12, 2016

(54) SUMMARY AND NAVIGATION OF HIERARCHICAL LEVELS

(75) Inventors: Michael Matas, San Francisco, CA (US); Kimon Tsinteris, San Francisco, CA (US); Austin Sarner, San Francisco, CA (US); Charles Melcher, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/487,765

(22) Filed: Jun. 4, 2012
(Under 37 CFR 1.47)

(65) Prior Publication Data
US 2014/0013283 A1    Jan. 9, 2014

Related U.S. Application Data

(60) Provisional application No. 61/593,841, filed on Feb. 1, 2012.

(51) Int. Cl.
| | |
|---|---|
| G06F 3/01 | (2006.01) |
| G06F 3/0481 | (2013.01) |
| G06T 15/60 | (2006.01) |
| G06T 11/60 | (2006.01) |
| G06F 3/0484 | (2013.01) |
| G06F 3/0485 | (2013.01) |
| G06F 17/21 | (2006.01) |
| H04L 29/08 | (2006.01) |

(52) U.S. Cl.
CPC ............ *G06F 3/04815* (2013.01); *G06F 3/017* (2013.01); *G06F 3/0481* (2013.01); *G06F 3/0484* (2013.01); *G06F 3/0485* (2013.01); *G06F 3/04842* (2013.01); *G06F 17/211* (2013.01); *G06T 11/60* (2013.01); *G06T 15/60* (2013.01); *H04L 67/06* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 4,730,314 A * | 3/1988 | Noguchi | G06F 11/25 714/724 |
| 5,727,129 A | 3/1998 | Barrett | |
| 6,421,071 B1 | 7/2002 | Harrison | |
| 6,847,388 B2 | 1/2005 | Anderson | |
| 6,934,740 B1 | 8/2005 | Lawande | |
| 6,948,125 B2 | 9/2005 | Detweiler | |
| 6,971,957 B2 | 12/2005 | Osako | |
| 7,320,113 B2 * | 1/2008 | Roberts | 715/853 |
| 7,434,245 B1 * | 10/2008 | Shiga et al. | 725/43 |
| 7,439,975 B2 | 10/2008 | Hsu | |
| 7,663,620 B2 | 2/2010 | Robertson | |
| 7,663,623 B2 | 2/2010 | Zhou | |

(Continued)

OTHER PUBLICATIONS

U.S. Appl. No. 13/487,805, filed Jun. 4, 2012, Matas.

(Continued)

*Primary Examiner* — Matt Kim
*Assistant Examiner* — Maryam Ipakchi
(74) *Attorney, Agent, or Firm* — Baker Botts L.L.P.

(57) ABSTRACT

In one embodiment, one or more components of a user interface are arranged in a hierarchy of layers. The user interface is presented according to the structure of the hierarchy, with a first component of the user interface presented at a first layer. One or more second component are presented at a second layer, the second components being one or more children of the first component and the second layer being one layer above the first layer.

20 Claims, 18 Drawing Sheets

(56) References Cited

U.S. PATENT DOCUMENTS

| | | |
|---|---|---|
| 7,664,739 B2 | 2/2010 | Farago |
| 7,667,719 B2 | 2/2010 | Goodwin |
| 7,675,518 B1 | 3/2010 | Miller |
| 7,689,933 B1 | 3/2010 | Parsons |
| 7,743,322 B2 | 6/2010 | Atkins |
| 7,769,794 B2 * | 8/2010 | Moore et al. .................. 707/831 |
| 7,797,641 B2 | 9/2010 | Karukka |
| 7,817,823 B1 | 10/2010 | O'Donnell |
| 7,890,889 B2 | 2/2011 | Artman |
| 7,916,157 B1 | 3/2011 | Kelley |
| 7,996,788 B2 | 8/2011 | Carmichael |
| 8,006,195 B1 | 8/2011 | Woodings |
| 8,082,522 B2 | 12/2011 | Kinouchi |
| 8,131,898 B2 | 3/2012 | Shah |
| 8,140,404 B1 | 3/2012 | Scott |
| 8,341,543 B2 | 12/2012 | Shah |
| 8,365,091 B2 | 1/2013 | Young |
| 8,416,198 B2 | 4/2013 | Rathnam |
| 8,423,889 B1 | 4/2013 | Zagorie |
| 8,438,504 B2 | 5/2013 | Cranfill |
| 8,458,614 B1 | 6/2013 | Smith |
| 8,473,868 B1 | 6/2013 | Kauffman |
| 8,516,385 B1 | 8/2013 | Eismann |
| 8,533,190 B2 | 9/2013 | Walker |
| 8,539,344 B2 | 9/2013 | Hull |
| 8,539,384 B2 | 9/2013 | Hinckley |
| 8,549,442 B2 | 10/2013 | Marks |
| 8,584,027 B2 | 11/2013 | Quennesson |
| 8,635,531 B2 | 1/2014 | Graham |
| 8,639,694 B1 | 1/2014 | Wolfe |
| 8,656,312 B2 | 2/2014 | Kagaya |
| 8,669,950 B2 | 3/2014 | Forstall |
| 8,683,378 B2 | 3/2014 | Bull |
| 8,736,561 B2 | 5/2014 | Anzures |
| 8,799,658 B1 | 8/2014 | Seller |
| 8,806,371 B2 | 8/2014 | Louch |
| 8,856,678 B1 | 10/2014 | Cho |
| 8,856,684 B2 | 10/2014 | Duhig |
| 8,904,304 B2 * | 12/2014 | Farago .......................... 715/776 |
| 8,930,992 B2 | 1/2015 | Sugiyama |
| 8,976,199 B2 | 3/2015 | Matas |
| 8,977,980 B2 | 3/2015 | Abe |
| 8,984,428 B2 | 3/2015 | Matas |
| 8,990,691 B2 | 3/2015 | Matas |
| 8,990,719 B2 | 3/2015 | Matas |
| 8,997,151 B2 * | 3/2015 | Chai .................. H04N 5/44543 <br> 725/39 |
| 9,003,305 B2 | 4/2015 | Matas |
| 9,007,371 B2 | 4/2015 | Matas |
| 9,009,626 B2 | 4/2015 | Tsuk |
| 9,098,168 B2 | 8/2015 | Matas |
| 2001/0030667 A1 | 10/2001 | Kelts |
| 2001/0033303 A1 | 10/2001 | Anderson |
| 2002/0029232 A1 | 3/2002 | Bobrow |
| 2002/0070982 A1 | 6/2002 | Hill |
| 2002/0107892 A1 | 8/2002 | Chittu |
| 2003/0001907 A1 | 1/2003 | Bergsten |
| 2003/0046401 A1 | 3/2003 | Abbott |
| 2003/0051214 A1 | 3/2003 | Graham |
| 2003/0090504 A1 | 5/2003 | Brook |
| 2003/0236917 A1 | 12/2003 | Gibbs |
| 2004/0001106 A1 | 1/2004 | Deutscher |
| 2004/0095376 A1 | 5/2004 | Graham |
| 2004/0145603 A1 | 7/2004 | Soares |
| 2005/0005246 A1 | 1/2005 | Card |
| 2005/0010955 A1 | 1/2005 | Elia |
| 2005/0055426 A1 | 3/2005 | Smith |
| 2005/0071783 A1 | 3/2005 | Atkins |
| 2005/0177798 A1 | 8/2005 | Thomson |
| 2005/0210403 A1 | 9/2005 | Satanek |
| 2005/0262149 A1 | 11/2005 | Jung |
| 2006/0017735 A1 | 1/2006 | Rabb |
| 2006/0036625 A1 | 2/2006 | Judd |
| 2006/0056334 A1 | 3/2006 | Yuan |
| 2006/0059425 A1 | 3/2006 | Anspach |
| 2006/0150091 A1 | 7/2006 | Suzuki |
| 2006/0174209 A1 * | 8/2006 | Barros ........................ 715/764 |
| 2006/0230354 A1 | 10/2006 | Jennings |
| 2006/0236251 A1 | 10/2006 | Kataoka |
| 2006/0253777 A1 | 11/2006 | Yalovsky |
| 2007/0073719 A1 | 3/2007 | Ramer |
| 2007/0088681 A1 | 4/2007 | Aravamudan |
| 2007/0115300 A1 | 5/2007 | Barney |
| 2007/0150826 A1 | 6/2007 | Anzures |
| 2007/0198950 A1 | 8/2007 | Dodge |
| 2007/0226640 A1 | 9/2007 | Holbrook |
| 2007/0258642 A1 | 11/2007 | Thota |
| 2007/0271516 A1 | 11/2007 | Carmichael |
| 2007/0281733 A1 | 12/2007 | Griffin |
| 2008/0022229 A1 | 1/2008 | Bhumkar |
| 2008/0025529 A1 | 1/2008 | Keohane |
| 2008/0052636 A1 | 2/2008 | Abe |
| 2008/0052742 A1 * | 2/2008 | Kopf .................. H04N 5/44591 <br> 725/34 |
| 2008/0065675 A1 | 3/2008 | Bozich |
| 2008/0079972 A1 | 4/2008 | Goodwin |
| 2008/0082927 A1 | 4/2008 | Kelts |
| 2008/0098330 A1 | 4/2008 | Tsuk |
| 2008/0155458 A1 | 6/2008 | Fagans |
| 2008/0168404 A1 | 7/2008 | Ording |
| 2008/0174570 A1 | 7/2008 | Jobs |
| 2008/0222540 A1 | 9/2008 | Schulz |
| 2008/0276273 A1 * | 11/2008 | Billmaier et al. ................ 725/37 |
| 2009/0007017 A1 | 1/2009 | Anzures |
| 2009/0007188 A1 | 1/2009 | Omernick |
| 2009/0061837 A1 | 3/2009 | Chaudhri |
| 2009/0070710 A1 | 3/2009 | Kagaya |
| 2009/0100373 A1 | 4/2009 | Pixley |
| 2009/0132921 A1 * | 5/2009 | Hwangbo ............. G06F 3/0482 <br> 715/716 |
| 2009/0172532 A1 | 7/2009 | Chaudhri |
| 2009/0172543 A1 * | 7/2009 | Cronin et al. .................. 715/721 |
| 2009/0199091 A1 * | 8/2009 | Covington ............ G06F 17/211 <br> 715/256 |
| 2009/0201270 A1 | 8/2009 | Pikkujamsa |
| 2009/0204928 A1 | 8/2009 | Kallio |
| 2009/0228782 A1 | 9/2009 | Fraser |
| 2009/0228832 A1 | 9/2009 | Cheng |
| 2009/0249239 A1 | 10/2009 | Eilers |
| 2009/0271703 A1 | 10/2009 | Chu |
| 2009/0288032 A1 | 11/2009 | Chang |
| 2009/0300548 A1 * | 12/2009 | Sullivan et al. ................ 715/830 |
| 2009/0309846 A1 | 12/2009 | Trachtenberg |
| 2010/0060666 A1 | 3/2010 | Fong |
| 2010/0097338 A1 | 4/2010 | Miyashita |
| 2010/0114991 A1 * | 5/2010 | Chaudhary et al. ........... 707/809 |
| 2010/0119180 A1 | 5/2010 | Brichter |
| 2010/0122195 A1 | 5/2010 | Hwang |
| 2010/0122214 A1 * | 5/2010 | Sengoku ............... G06F 3/0485 <br> 715/830 |
| 2010/0174993 A1 | 7/2010 | Pennington |
| 2010/0277496 A1 | 11/2010 | Kawanishi |
| 2010/0287494 A1 | 11/2010 | Ording |
| 2010/0313125 A1 | 12/2010 | Fleizach |
| 2011/0035703 A1 | 2/2011 | Negishi |
| 2011/0063248 A1 | 3/2011 | Yoon |
| 2011/0074699 A1 * | 3/2011 | Marr ...................... G06F 3/0485 <br> 345/173 |
| 2011/0122078 A1 * | 5/2011 | Kasahara ...................... 345/173 |
| 2011/0122159 A1 * | 5/2011 | Bergsten ............. G06F 3/0482 <br> 345/684 |
| 2011/0157051 A1 | 6/2011 | Shohga |
| 2011/0161818 A1 | 6/2011 | Viljamaa |
| 2011/0163969 A1 | 7/2011 | Anzures |
| 2011/0163971 A1 * | 7/2011 | Wagner et al. ................. 345/173 |
| 2011/0167380 A1 | 7/2011 | Stallings |
| 2011/0185314 A1 | 7/2011 | Sahai |
| 2011/0187655 A1 | 8/2011 | Min |
| 2011/0202834 A1 | 8/2011 | Mandryk |
| 2011/0209100 A1 | 8/2011 | Hinckley |
| 2011/0234615 A1 | 9/2011 | Hanson |
| 2011/0246614 A1 | 10/2011 | Votaw |
| 2011/0276863 A1 | 11/2011 | Bhise |
| 2011/0296344 A1 | 12/2011 | Habib |

(56) References Cited

U.S. PATENT DOCUMENTS

| | | | |
|---|---|---|---|
| 2011/0302532 A1 | 12/2011 | Missig | |
| 2012/0005623 A1 | 1/2012 | Ishak | |
| 2012/0026611 A1 | 2/2012 | Kinnucan | |
| 2012/0047432 A1 | 2/2012 | Yalovsky | |
| 2012/0054684 A1 | 3/2012 | Gossweiler | |
| 2012/0070017 A1 | 3/2012 | Dorogusker | |
| 2012/0084662 A1 | 4/2012 | Navarro | |
| 2012/0105489 A1 | 5/2012 | Monroe | |
| 2012/0131516 A1 | 5/2012 | Chiu | |
| 2012/0148088 A1 | 6/2012 | Mital | |
| 2012/0159381 A1* | 6/2012 | Tseng | G06F 3/0482 715/784 |
| 2012/0159393 A1 | 6/2012 | Sethi | |
| 2012/0192101 A1 | 7/2012 | Migos | |
| 2012/0192118 A1 | 7/2012 | Migos | |
| 2012/0227002 A1 | 9/2012 | Tiwarie | |
| 2012/0233565 A1 | 9/2012 | Grant | |
| 2012/0233573 A1 | 9/2012 | Sullivan | |
| 2012/0266068 A1 | 10/2012 | Ryman | |
| 2012/0266104 A1 | 10/2012 | Shah | |
| 2012/0266130 A1 | 10/2012 | Kinnucan | |
| 2012/0272171 A1 | 10/2012 | Icho | |
| 2012/0272181 A1 | 10/2012 | Rogers | |
| 2012/0311438 A1* | 12/2012 | Cranfill et al. | 715/256 |
| 2012/0327009 A1 | 12/2012 | Fleizach | |
| 2013/0019263 A1* | 1/2013 | Ferren et al. | 725/37 |
| 2013/0067510 A1 | 3/2013 | Ahanger | |
| 2013/0073932 A1* | 3/2013 | Migos et al. | 715/201 |
| 2013/0104017 A1 | 4/2013 | Ko | |
| 2013/0135309 A1 | 5/2013 | King | |
| 2013/0183943 A1 | 7/2013 | Tow | |
| 2013/0194269 A1 | 8/2013 | Matas | |
| 2013/0194307 A1 | 8/2013 | Matas | |
| 2013/0198261 A1 | 8/2013 | Matas | |
| 2013/0198631 A1 | 8/2013 | Matas | |
| 2013/0198634 A1 | 8/2013 | Matas | |
| 2013/0198661 A1 | 8/2013 | Matas | |
| 2013/0198663 A1* | 8/2013 | Matas et al. | 715/765 |
| 2013/0198664 A1 | 8/2013 | Matas | |
| 2013/0198665 A1 | 8/2013 | Matas | |
| 2013/0198666 A1 | 8/2013 | Matas | |
| 2013/0198668 A1 | 8/2013 | Matas | |
| 2013/0198681 A1* | 8/2013 | Matas et al. | 715/784 |
| 2013/0198682 A1 | 8/2013 | Matas | |
| 2013/0198683 A1 | 8/2013 | Matas | |
| 2013/0205210 A1 | 8/2013 | Jeon | |
| 2013/0227494 A1 | 8/2013 | Matas | |
| 2013/0307792 A1* | 11/2013 | Andres | G11B 27/005 345/173 |
| 2013/0314341 A1 | 11/2013 | Lee | |
| 2013/0339907 A1 | 12/2013 | Matas | |
| 2013/0346906 A1 | 12/2013 | Farago | |
| 2014/0033124 A1 | 1/2014 | Sorrick | |
| 2014/0046809 A1 | 2/2014 | Baker | |
| 2014/0164985 A1 | 6/2014 | Pimmel | |
| 2014/0250358 A1 | 9/2014 | Milener | |
| 2014/0258849 A1 | 9/2014 | Chung | |
| 2014/0282262 A1 | 9/2014 | Gregotski | |
| 2014/0282263 A1 | 9/2014 | Pennington | |
| 2014/0288686 A1 | 9/2014 | Sant | |
| 2015/0026825 A1 | 1/2015 | Dube | |
| 2015/0095839 A1* | 4/2015 | Hombert | G11B 27/34 715/781 |
| 2015/0100880 A1 | 4/2015 | Matas | |
| 2015/0100924 A1 | 4/2015 | Matas | |

OTHER PUBLICATIONS

U.S. Appl. No. 13/555,607, filed Jul. 23, 2012, Matas.
U.S. Appl. No. 13/555,657, filed Jul. 23, 2012, Matas.
U.S. Appl. No. 13/555,845, filed Jul. 23, 2012, Matas.
U.S. Appl. No. 13/488,039, filed Jun. 4, 2012, Matas.
U.S. Appl. No. 13/555,876, filed Jul. 23, 2012, Matas.
U.S. Appl. No. 13/490,343, filed Jun. 6, 2012, Matas.
U.S. Appl. No. 13/488,076, filed Jun. 4, 2012, Matas.
U.S. Appl. No. 13/555,909, filed Jul. 23, 2012, Matas.
U.S. Appl. No. 13/490,367, filed Jun. 6, 2012, Matas.
U.S. Appl. No. 13/490,736, filed Jun. 7, 2012, Matas.
U.S. Appl. No. 13/489,172, filed Jun. 5, 2012, Matas.
U.S. Appl. No. 13/491,100, filed Jun. 7, 2012, Matas.
U.S. Appl. No. 13/489,265, filed Jun. 5, 2012, Matas.
Final Office Action for U.S. Appl. No. 13/487,805, Jun. 1, 2015.
Response to Non-Final Office Action for U.S. Appl. No. 13/487,805, May 18, 2015.
Non-Final Office Action for U.S. Appl. No. 13/487,805, Jan. 16, 2015.
Notice of Allowance for U.S. Appl. No. 13/555,607, Mar. 4, 2015.
Response to Final Office Action for U.S. Appl. No. 13/555,607, Feb. 12, 2015.
Notice of Allowance for U.S. Appl. No. 13/555,657, Feb. 11, 2015.
Notice of Allowance for U.S. Appl. No. 13/555,845, Jan. 30, 2015.
Notice of Allowance for U.S. Appl. No. 13/555,845, Dec. 19, 2014.
Non-Final Office Action for U.S. Appl. No. 13/488,039, Apr. 24, 2015.
Response to Final Office Action for U.S. Appl. No. 13/488,039, Mar. 17, 2015.
Non-Final Office Action for U.S. Appl. No. 13/555,876, Apr. 30, 2015.
Response to Final Office Action for U.S. Appl. No. 13/555,876, Mar. 23, 2015.
Notice of Allowance for U.S. Appl. No. 13/490,343, Jan. 29, 2015.
Notice of Allowance for U.S. Appl. No. 13/490,343, Jan. 14, 2015.
Non-Final Office Action for U.S. Appl. No. 13/488,076, Jan. 15, 2015.
Response to Non-Final Office Action for U.S. Appl. No. 13/555,909, Mar. 4, 2015.
Final Office Action for U.S. Appl. No. 13/490,367, May 21, 2015.
Response to Non-Final Office Action for U.S. Appl. No. 13/490,367, Mar. 19, 2015.
Notice of Allowance for U.S. Appl. No. 13/490,736, Feb. 25, 2015.
Response to Final Office Action for U.S. Appl. No. 13/489,172, Feb. 12, 2015.
Non-Final Office Action for U.S. Appl. No. 13/491,100, May 29, 2015.
Response to Final Office Action for U.S. Appl. No. 13/491,100, May 18, 2015.
Final Office Action for U.S. Appl. No. 13/491,100, Feb. 27, 2015.
Notice of Allowance for U.S. Appl. No. 13/489,265, Jan. 30, 2015.
Final Office Action for U.S. Appl. No. 13/677,093, May 28, 2015.
Response to Non-Final Office Action for U.S. Appl. No. 13/677,093, Mar. 19, 2015.
Final Office Action for U.S. Appl. No. 13/677,132, Apr. 7, 2015.
Borst, C. et al., "A Spring Model for Whole-Hand Virtual Grasping," Presence, vol. 15, No. 1, pp. 47, 61, Feb. 2006, doi: 10.1162/pres.2006.15.1.47, http://ieeexplore.ieee.org/stamp/stamp.jsp?tp=&arnumber=6797721&isnumber=6797198, Jun. 3, 2015.
Response to Final Office Action for U.S. Appl. No. 13/487,805, Dec. 29, 2014.
Final Office Action for U.S. Appl. No. 13/487,805, Sep. 26, 2014.
Response to Non-Final Office Action for U.S. Appl. No. 13/487,805, Jul. 31, 2014.
Non-Final Office Action for U.S. Appl. No. 13/487,805, Apr. 3, 2014.
Final Office Action for U.S. Appl. No. 13/555,607, Dec. 3, 2014.
Response to Non-Final Office Action for U.S. Appl. No. 13/555,607, Nov. 4, 2014.
Non-Final Office Action for U.S. Appl. No. 13/555,607, Aug. 20, 2014.
Amendment under Rule 312 for U.S. Appl. No. 13/555,657, Dec. 30, 2014.
Notice of Allowance for U.S. Appl. No. 13/555,657, Dec. 5, 2014.
Response to Non-Final Office Action for U.S. Appl. No. 13/555,657, Nov. 19, 2014.
Non-Final Office Action for U.S. Appl. No. 13/555,657, Sep. 18, 2014.
Response to Non-Final Office Action for U.S. Appl. No. 13/555,845, Oct. 24, 2014.
Non-Final Office Action for U.S. Appl. No. 13/555,845, Apr. 24, 2014.

(56) References Cited

OTHER PUBLICATIONS

Final Office Action for U.S. Appl. No. 13/488,039, Dec. 12, 2014.
Response to Non-Final Office Action for U.S. Appl. No. 13/488,039, Nov. 7, 2014.
Non-Final Office Action for U.S. Appl. No. 13/488,039, Jun. 11, 2014.
Final Office Action for U.S. Appl. No. 13/555,876, Nov. 20, 2014.
Response to Non-Final Office Action for U.S. Appl. No. 13/555,876, Oct. 23, 2014.
U.S. Appl. No. 14/569,475, filed Dec. 12, 2014, Matas.
U.S. Appl. No. 14/572,405, filed Dec. 16, 2014, Matas.
Non-Final Office Action for U.S. Appl. No. 13/555,876, Jul. 14, 2014.
Response to Final Office Action for U.S. Appl. No. 13/490,343, Dec. 19, 2014.
Final Office Action for U.S. Appl. No. 13/490,343, Nov. 7, 2014.
Response to Non-Final Office Action for U.S. Appl. No. 13/490,343, Oct. 22, 2014.
Non-Final Office Action for U.S. Appl. No. 13/490,343, Jun. 4, 2014.
Response to Final Office Action for U.S. Appl. No. 13/488,076, Dec. 29, 2014.
Final Office Action for U.S. Appl. No. 13/488,076, Oct. 3, 2014.
Response to Non-Final Office Action for U.S. Appl. No. 13/488,076, Jul. 31, 2014.
Non-Final Office Action for U.S. Appl. No. 13/488,076, Apr. 1, 2014.
Non-Final Office Action for U.S. Appl. No. 13/555,909, Nov. 14, 2014.
Response to Final Office Action for U.S. Appl. No. 13/555,909, Aug. 8, 2014.
Final Office Action for U.S. Appl. No. 13/555,909, Apr. 28, 2014.
Response to Non-Final Office Action for U.S. Appl. No. 13/555,909, Mar. 27, 2014.
Non-Final Office Action for U.S. Appl. No. 13/555,909, Jan. 2, 2014.
Non-Final Office Action for U.S. Appl. No. 13/490,367, Nov. 20, 2014.
Response to Final Office Action for U.S. Appl. No. 13/490,367, Sep. 19, 2014.
Final Office Action for U.S. Appl. No. 13/490,367, May 1, 2014.
Response to Non-Final Office Action for U.S. Appl. No. 13/490,367, Apr. 4, 2014.
Non-Final Office Action for U.S. Appl. No. 13/490,367, Jan. 3, 2014.
Notice of Allowance for U.S. Appl. No. 13/490,736, Nov. 21, 2014.
Response to Non-Final Office Action for U.S. Appl. No. 13/490,736, Oct. 23, 2014.
Non-Final Office Action for U.S. Appl. No. 13/490,736, Jul. 8, 2014.
Final Office Action for U.S. Appl. No. 13/489,172, Dec. 12, 2014.
Response to Non-Final Office Action for U.S. Appl. No. 13/489,172, Aug. 12, 2014.
Non-Final Office Action for U.S. Appl. No. 13/489,172, Mar. 28, 2014.
Response to Non-Final Office Action for U.S. Appl. No. 13/491,100, Oct. 30, 2014.
Non-Final Office Action for U.S. Appl. No. 13/491,100, Jul. 31, 2014.
Notice of Allowance for U.S. Appl. No. 13/489,265, Nov. 7, 2014.
Response to Non-Final Office Action for U.S. Appl. No. 13/489,265, Oct. 28, 2014.
Non-Final Office Action for U.S. Appl. No. 13/489,265, May 2, 2014.
Response to Non-Final Office Action for U.S. Appl. No. 13/677,132, Jan. 5, 2015.
Non-Final Office Action for U.S. Appl. No. 13/677,132, Oct. 3, 2014.
Non-Final Office Action for U.S. Appl. No. 13/677,093, Nov. 21, 2014.
Response to Final Office Action for U.S. Appl. No. 13/487,805, Nov. 2, 2015.
Notice of Allowance for U.S. Appl. No. 13/488,039, Sep. 10, 2015.
Response to Non-Final Office Action for U.S. Appl. No. 13/488,039, Aug. 7, 2015.
Final Office Action for U.S. Appl. No. 13/555,876, Sep. 10, 2015.
Response to Final Office Action for U.S. Appl. No. 13/555,876, Aug. 5, 2015.
Notice of Allowance for U.S. Appl. No. 13/488,076, Aug. 31, 2015.
Response to Non-Final Office Action for U.S. Appl. No. 13/488,076, Jul. 15, 2015.
Notice of Allowance for U.S. Appl. No. 13/555,909, Jun. 24, 2015.
Notice of Allowance for U.S. Appl. No. 13/555,909, Jun. 3, 2015.
Response to Final Office Action for U.S. Appl. No. 13/490,367, Oct. 20, 2015.
Non-Final Office Action for U.S. Appl. No. 13/489,172, Oct. 7, 2015.
Notice of Allowance for U.S. Appl. No. 13/491,100, Sep. 18, 2015.
Response to Non-Final Office Action for U.S. Appl. No. 13/491,100, Aug. 28, 2015.
Non-Final Office Action for U.S. Appl. No. 13/677,093, Oct. 5, 2015.
Response to Final Office Action for U.S. Appl. No. 13/677,093, Aug. 13, 2015.
Final Office Action for U.S. Appl. No. 13/677,132, Sep. 28, 2015.
Response to Final Office Action for U.S. Appl. No. 13/677,132, Jun. 24, 2015.

* cited by examiner

SUMMARY AND NAVIGATION OF HIERARCHICAL LEVELS

RELATED APPLICATION(S)

This application claims the benefit, under 35 U.S.C. §119 (e), of U.S. Provisional Patent Application No. 61/593,841, filed 1 Feb. 2012, which is incorporated herein by reference.

TECHNICAL FIELD

This disclosure generally relates to a user interface having components arranged in a hierarchy.

BACKGROUND

A user of an electronic device or a software application (including standalone, web-based, or mobile application) may interact with the device through a user interface. The user interface may provide output to the user and accept input from the user. Electronic devices that may contain a user interface include a desktop computer, laptop computer, tablet computer, personal digital assistant (PDA), smartphone, satellite navigation device, portable media player, portable game console, kiosk computer, point-of-sale device, or other suitable device.

A user may interact with a device or software application through the use of visual displays, such as graphics or text generated on a display of the device. For example, a graphical user interface (GUI) may provide windows, icons, pictures, video, or any other suitable visual display to provide output to a user. A user of an electronic device may interact with a device or software application through the use of a computer mouse, keyboard, trackball, scroll wheel, buttons, or any other suitable means. A user may also or alternatively interact with a device or software application through contact with a touch-sensitive area of the device. For example, a touch-sensitive area may be a resistive or capacitive touch-sensitive display. Contact providing input to the device may be made either directly by the user contacting the touch-sensitive display or by a utensil such as a stylus operated by the user.

DESCRIPTION OF EXAMPLE EMBODIMENTS

In particular embodiments, a user interface (UI) may include any number of components. The UI components may represent or correspond to various objects of any applicable types. In particular embodiments, the UI components may be arranged in a hierarchy and presented to a user according to the structure of the hierarchy. In particular embodiments, the UI components' hierarchical structure corresponds to the hierarchical structure of the objects the UI components represent. The UI hierarchy may include any number of layers, and at each layer, there may be any number of UI components. Relationships may exist among specific UI components, and the positions of the individual UI components within the UI hierarchy may indicate specific relationships among these components. When the user interface is presented to a user, the user may navigate between UI layers or UI components as well as interact with the UI components.

Figure 1:
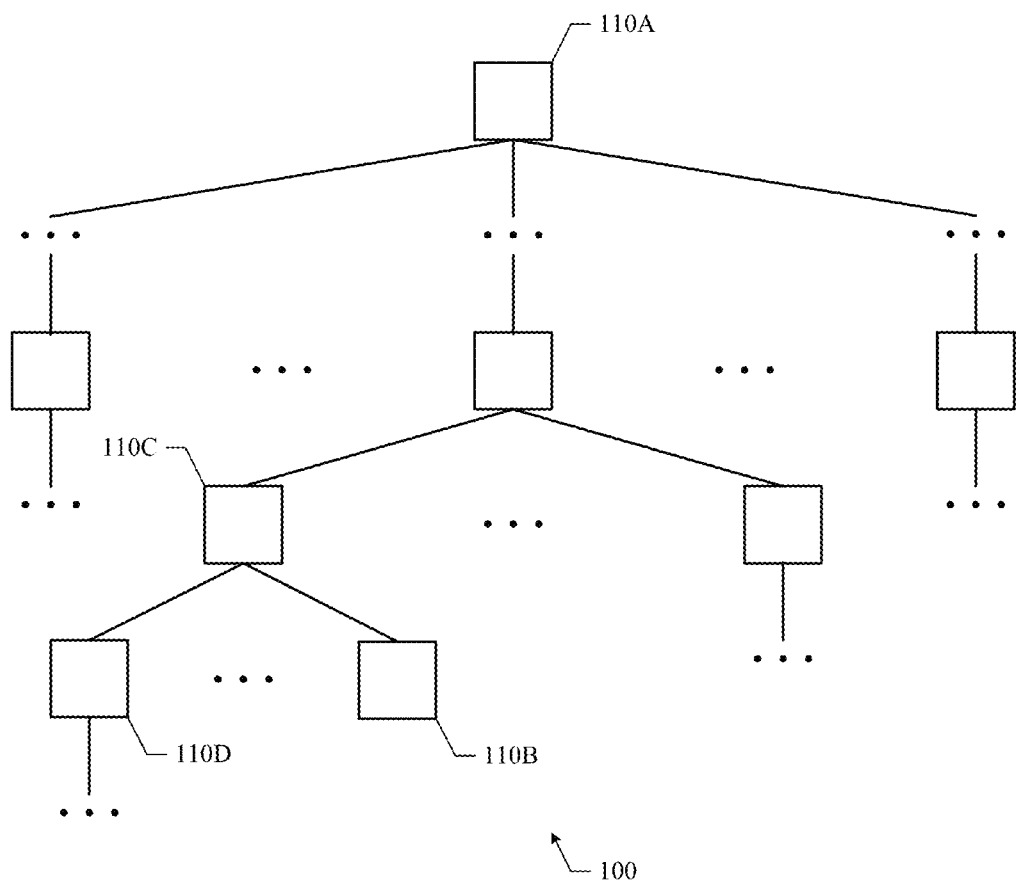
FIG. 1 illustrates a portion of an object hierarchy that includes a number of objects.

In general, objects may be arranged in a hierarchy. In particular embodiments, objects may be organized into a hierarchy based on how the individual objects are related to each other. The hierarchy may have any number of levels, and at each level, there may be any number of objects. Parent-child or sibling relationships may exist between specific objects in the hierarchy. Within the hierarchy, a parent object is one level above the level of its child objects. Two sibling objects are at the same level and share the same parent object. An object and its children, siblings, or both may from a group within a hierarchy. In addition, any portion of the hierarchy may also be considered a hierarchy in itself. As an example, FIG. 1 illustrates a portion of an object hierarchy 100 that includes a number of objects 110. In particular embodiments, an object in a hierarchy may or may not have a parent. If an object does not have a parent, it may be referred to as a "root" object (e.g., object 110A). In particular embodiments, an object in a hierarchy may or may not have any children. If an object does not have any children, it may be referred to as a "leaf" object (e.g., object 110B). If an object does have children (e.g., object 110C), it may have any number of children. In addition, objects sharing the same parent may be referred to as each other's "siblings". For example, in FIG. 1, object 110C is the parent of objects 110D and 110B. Objects 110D and 110B are the children of object 110C and are siblings to each other. Thus, a hierarchy of objects (e.g., object hierarchy 100) not only includes the individual objects themselves but also indicates the relationships among the specific objects. Moreover, the position of a specific object within the hierarchy may be used to indicate its relationships with other objects in the hierarchy.

Objects may be of any applicable type. As described above, in particular embodiments, an object may be a component of a user interface. In this case, the object hierarchy may be a UI hierarchy (e.g., a hierarchy of UI components). In other words, components of a user interface may be organized into a hierarchy. The UI hierarchy may have any number of layers corresponding to the levels of the object hierarchy, and at each layer, there may be any number of UI components. The position of a specific UI component within the hierarchy may indicate its relationships with other UI components in the hierarchy. The UI components may be presented to users according to the hierarchical structure (e.g., in layers).

In particular embodiments, an object may correspond to a piece of user-consumable content. In particular embodiments, an object may be consumed by a user if the user may, for example and without limitation, interact with, view, read, listen to, manipulate, or handle the object. For example, some user-consumable objects may be texts, images, videos, audios, feeds, executables (e.g., application programs or games), websites, web pages, digital books, photo albums, posts, or messages. In particular embodiments, user-consumable content, or more specifically, user-consumable objects, may be organized into a hierarchy based on, for example, the relationships among the individual pieces of user-consumable content. Consequently, a hierarchy of user-consumable content may be represented as a hierarchy of objects, where individual objects in the hierarchy may correspond to specific pieces of user-consumable content (e.g., texts, images, videos, audios, executables, etc.). In addition, the structure of the hierarchy indicates the relationships among the specific pieces of user-consumable content.

In particular embodiments, the relationships among the objects in a hierarchy may correspond to how the objects are organized and presented to users. In particular embodiments, when presenting a hierarchy of objects to a user of a device, the objects may be organized and presented according to the structure of the object hierarchy. More specifically, the objects may be presented in a user interface provided on the device according to the structure of the object hierarchy so that the user interface itself becomes hierarchical as well. Consequently, the user interface may include any number of layers, respectively corresponding to the levels in the object hierarchy. The positions of the objects within the hierarchy are preserved in the user interface, such that a specific object at a specific position in the hierarchy is presented in the corresponding position in the user interface. The relationships among the objects within the hierarchy are maintained in the user interface. In other words, there may be an one-to-one correspondence between an object in the object hierarchy and a UI component in the user interface, such that each object is represented by a UI component.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or any graphical user interface (GUI) or content or media elements on each page. Each of these also corresponds to an object in the hierarchy. More specifically, when these objects are organized in a hierarchy, the book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or any GUI or content or media elements on that page. A text block, image, video, audio, or GUI or content or media element is one of the child objects of the page to which it belongs. Similarly, for a software application that manages news feeds, its components may include the individual news channels and the news stories within each channel. Each of these may correspond to an object. When these objects are arranged in a hierarchy, the news-feed application, while itself being one of the child objects of the desktop, is also the parent object of the news channels. A news channel in turn is the parent object of the news stories included in that channel. Some or all of these objects may correspond to UI components of a user interface presented on the computing device.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy. Some or all of these objects may correspond to UI components of a web-based user interface that may be presented to a user through a web browser.

As a third example, a website, such as a social-networking website, may be arranged in hierarchical structure. In this context, the social-networking website may be a parent object whose child objects are the components (e.g., photo albums, user profile pages, etc.) of the website. For example, a photo album, while itself a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, etc. In particular embodiments, child objects in the hierarchy may also include applications the user has added to the profile page, such as a Spotify music sharing application. Moreover, individual stories, songs the user has listened to, and playlists may be child objects at a lower hierarchical level. In particular embodiments, child objects in the hierarchy may include particular sections of a user's profile, such as the user's education and employment information, or the public "wall" of the user's profile page. As in the examples above, these objects may correspond to UI components of a web-based user interface that may be presented to a user through a web browser or application. While the above examples describe particular examples of objects and corresponding UI components arranged in hierarchical structures, this disclosure contemplates representing and addressing any collection of content in a hierarchical structure.

As the above examples illustrate, an object may be of any type and this disclosure contemplates any applicable types of objects. For example and without limitation, the term "object" may refer to any type of content, including but not limited to images, videos, captions, text blocks or boxes, user interface elements, URLs, newsfeed stories, references to other objects, advertisements, calendar events, units for displaying open graph analysis that may be graphically rendered, applications, websites, web pages, books, and chapters. In addition, "object" may refer to UI components arranged in a hierarchical structure corresponding to the hierarchical structure of the objects the UI components represent. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user. Particular UI components in a hierarchy may share attributes of presentation, interaction, functionality, or any other suitable characteristics. In other words, one or more attributes of e.g., presentation may be shared by two or more UI components in a hierarchy, as described more fully below.

In particular embodiments, a set of hierarchical UI components may be presented in a uniform or consistent way to a user. Particular aspects of one UI component's presentation may also uniformly apply to a set of UI components. A set of UI components may include all UI components sharing a parent, all UI components on the same layer of the hierarchy, all UI components in the hierarchy, or any other suitable set of UI components in the hierarchy. For example, all UI components at a given layer of the hierarchy may be displayed with the same dimensions or have the same boarder around the component when presented to a user. As another example, UI components that are parent objects may be displayed with some or all of their children. As another example, graphical embellishments such as objects fading in or out as a user navigates through the hierarchy may occur uniformly for all UI components in the hierarchy. While this disclosure provides specific examples of presenting hierarchical UI components in a uniform way for particular sets of UI components, this disclosure contemplates applying any suitable presentation characteristics in a uniform way for any suitable set of hierarchical UI components.

In particular embodiments, a user may interact with hierarchical UI components, for example, by observing, manipulating, handling, selecting, moving, opening, closing, activating, altering, or resizing objects. In particular embodiments, a group of interactions may be uniformly available to a user for a set of UI components in the hierarchy. In other words, if a group of interactions is available for one UI component in the set, some or all of the same group of interactions may be available for all UI components in the set. In addition or in the alternative, interactions may occur or be performed in a uniform way for a set of UI components. A set of UI components may include all UI components sharing a parent, all UI components on the same layer of the hierarchy, all UI components in the hierarchy, or any other suitable set of UI components in the hierarchy. As an example, an operation that navigates from one object to another may be performed in a uniform way for a set of UI components. As an illustration and not by way of limitation, a navigation operation may be a swiping gesture performed by one or more fingers on a touch-sensitive display of a device. Swiping may move the object in the same direction as the swipe, e.g., swiping from right to left on the display moves the swiped object towards left, and swiping from top to bottom moves the swiped object downward. Swiping may also move the swiped object in the opposite direction of the swipe. As another example, a resizing operation may be performed in a uniform way for a set of UI components. As an illustration and not by way of limitation, a resizing operation may be performed by double clicking on the UI component with a graphically-generated cursor or double tapping a UI component on a touch-sensitive display of a device. As another example, a moving operation may be performed in a uniform way for a set of UI components. As an illustration and not by way of limitation, a moving operation may be performed by using a graphically-generated cursor to select a UI component and drag it around a display. On a touch-sensitive display, one or more of a user's fingers may be used to select a UI component and drag it or rotate it on a display by dragging or rotating the fingers selecting the object. As another example, one or more states available to one UI component may be uniformly available for a set of UI components. As an illustration and not by way of limitation, a UI component may have several different presentation states, such as a summary view of the component, a cropped view of the component, and a full-screen view of the component. The actions taken by a user to transition a UI component among various states may be the same for a set of UI components. While this disclosure describes particular examples of interactions that may be uniformly available or executed for a set of hierarchical UI components, this disclosure contemplates any suitable interactions that may be uniformly available or executed for any suitable set of hierarchical UI components.

Figure 2A:
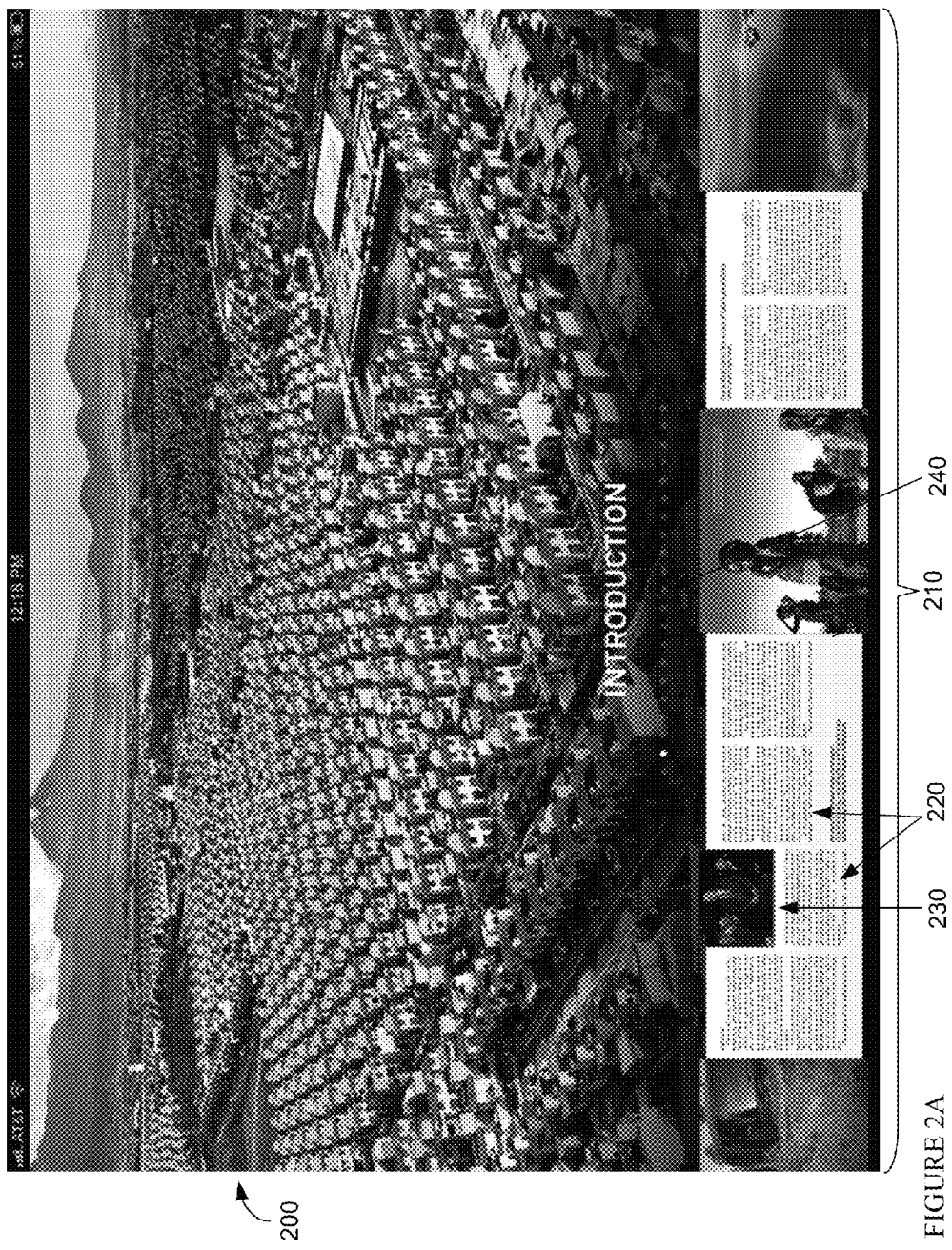
FIGS. 2A and 2B provide an example of simultaneous display of a parent user interface (UI) component and with some of it child UI components in the context of a digital book reader UI.

As discussed above, hierarchical UI components may share one or more presentation characteristics. As an example, when a device displays a parent UI component the device may simultaneously display some or all of the parent component's children. Similarly, when one or more child-objects are displayed the parent of the objects may be simultaneously displayed. FIG. 2A illustrates an example display of a parent object and some of its children in the context of a reader UI application. A reader UI enables a user to view and navigate content (e.g., books, news, images, videos, messages, e-mails, albums, music, any websites, including a social networking website hosted by a social networking system, etc.) on an electronic device. In particular embodiments, viewable content may include any number of UI components of various formats (e.g., book, chapter, page, text, image, video, audio, any GUI, contend, or media element) arranged in a hierarchy. A user may interact with specific UI components using various input means. As an example, if the electronic device supports touch-screen functionalities (e.g., tablet or smartphone), then the user may interact with specific objects through various hand gestures (e.g., slide, pinch, tap). Reader UI components may be interactive and manipulated via the user's input as described more fully below.

In particular embodiments, a reader UI may be a digital book that includes any number of sections (e.g., chapters). Each section may include any number of pages. Each page may include any number of text blocks, images, videos, audios, etc. In the example of FIG. 2A, section 200 (i.e. the "Introduction" section) is the parent object of the child-object pages 220 shown in strip 210, and object 230 is a child-object photo of the page 220 on which it is contained. Strip 210 is the table of content (TOC) of the pages 220 in section 200 and includes the thumbnail versions of the individual pages 220 in section 200. Strip 210 is one example of displaying multiple child objects with their parent. In this example, background area 200 is the lowest layer the hierarchy displayed on the device. TOC area 210 is another layer positioned on top of the background layer. Pages 220 in the TOC area 210 are a third layer positioned on top of the TOC layer, and image 230 is a fourth layer floating on top of the page 220 on which it is contained. Thus, in this example UI components from four layers of the hierarchy are displayed simultaneously. In particular embodiments, when objects from two or more levels of a hierarchy are displayed, one of the levels may be a primary level, taking up a larger portion of the display than one or more secondary levels taking up a smaller portion of the display. For example, TOC area 210 (along with its child objects) are displayed as secondary UI components, taking up a smaller portion of the display than its parent UI component section 200.

Figure 3A:
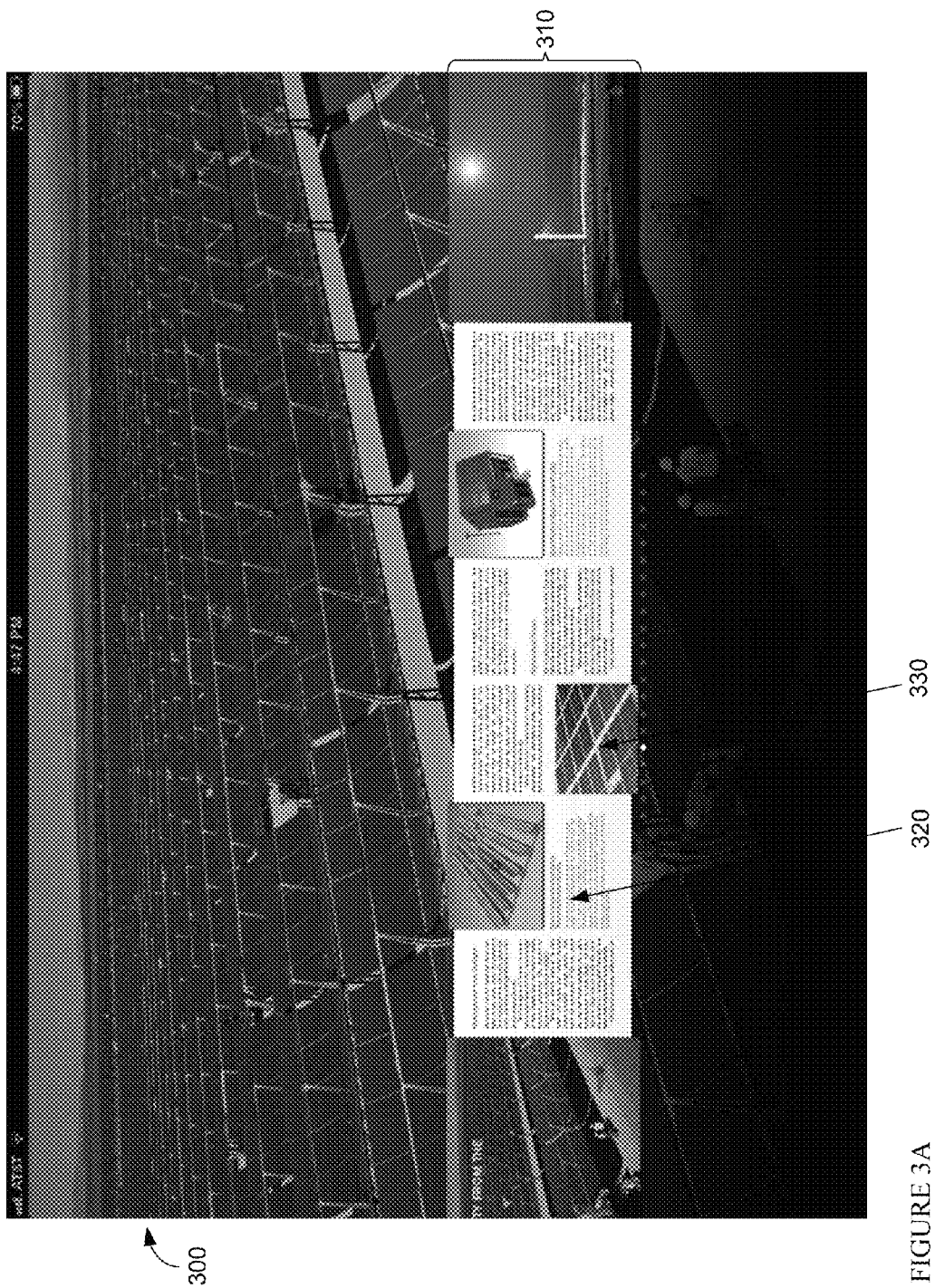
FIGS. 3A and 3B illustrate example manipulations of a summary of a collection of UI components presented as a table of contents.
Figure 3B:
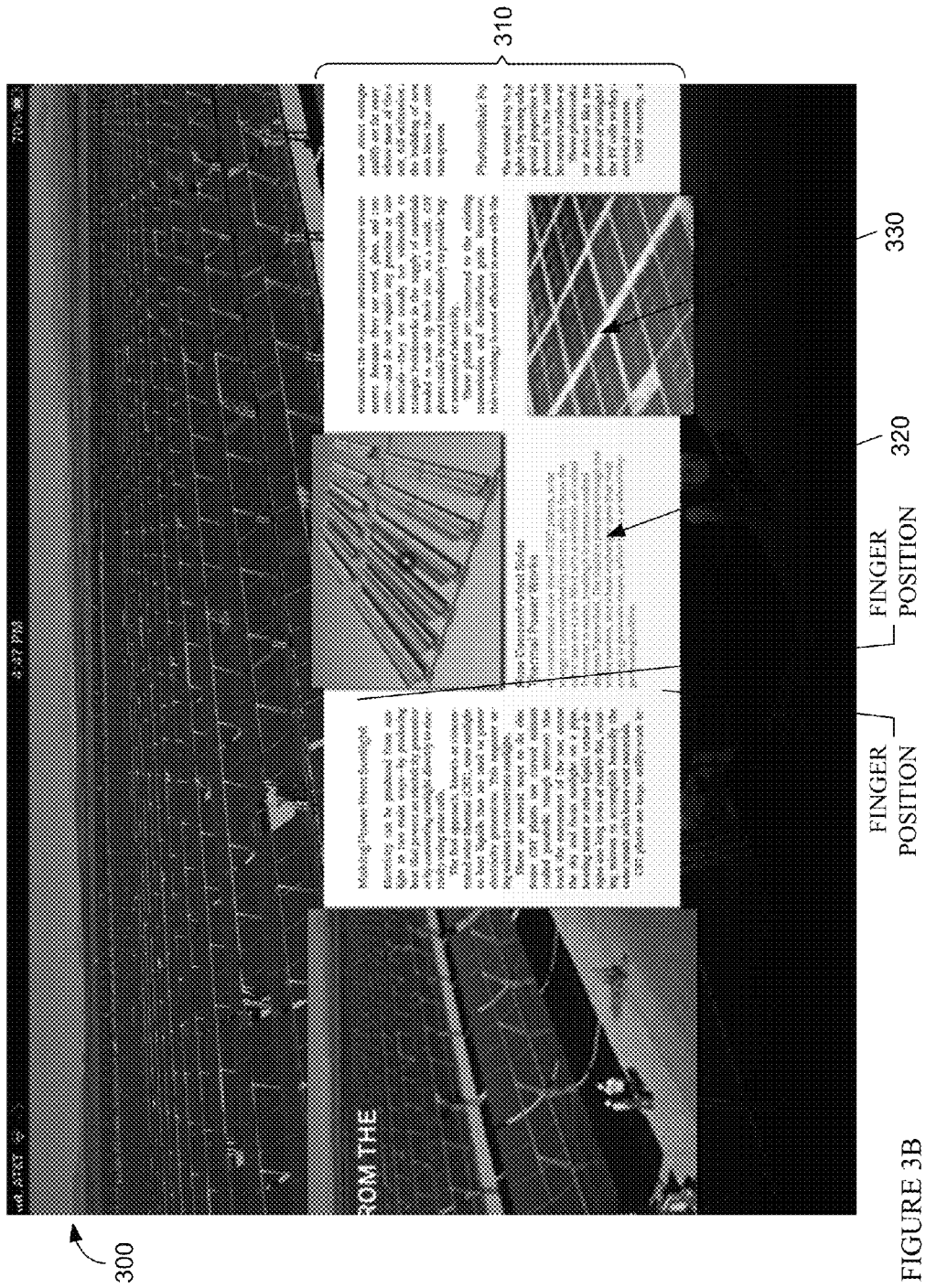

In particular embodiments, each UI component displayed on a device may be selected or manipulated individually. For example, TOC area 210 in FIG. 2A may be displayed in any orientation, such as horizontally, vertically, or diagonally, and may be displayed on or moved to any position on the display (e.g., bottom, top, middle, etc.). FIG. 3A illustrates TOC area 310 moved towards the middle of the display as a result of, for example, the user picking up TOC area 310 with a finger on a touch-sensitive screen and dragging TOC area 310 to the middle of the screen by dragging the finger picking up TOC area 310 to the middle of the screen. In particular embodiments, this allows the user to peek behind TOC area 310 to see the layer behind it, which in this example is background layer 300. Once released by a user, TOC area 310 may remain in its new position or may return to its original position. In particular embodiments, TOC area 310 may be resized. This may be achieved by selecting TOC area 310 with two fingers and then spreading the two fingers apart. Conversely, moving the two fingers selecting TOC area 310 closer together may decrease the size of TOC area 310. As an illustration, TOC area 310, along with its child pages (e.g., page 320) and images (e.g., image 330), in FIG. 3B has increased in size relative to TOC area 310 in FIG. 3A. The characteristics of and methods of achieving display, selection, movement, and resizing of UI components described above may apply uniformly to one or more sets of UI components in a hierarchy. For example, the ability to and method of resizing the collection of child UI components described above may uniformly apply to any similar collection of UI components in the UI reader application. In addition, while the above example is in the context of a reader UI, this disclosure contemplates application of the above principles to any suitable UI components in a hierarchical structure.

Figure 2B:
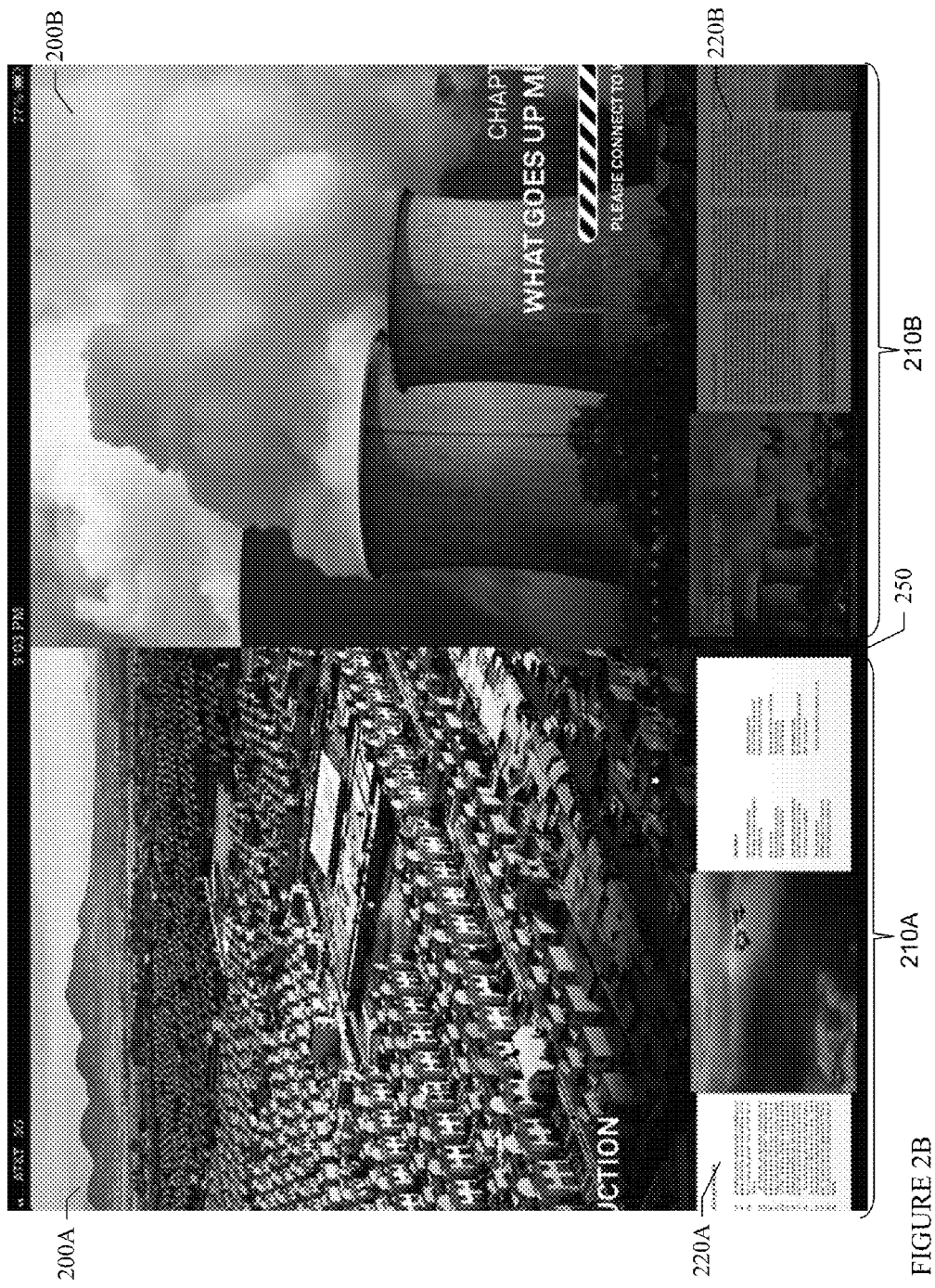

In particular embodiments, one or more objects or groups of objects may be connected in a particular way or for a particular purpose. For example, in the reader UI of FIG. 2B, child components TOC 210A and 210B are connected or "locked" to their respective parent components 200A and 200B for the purposes of movement. As shown in FIG. 2B, TOC 210A moves off of the display as parent 200A moves off of the display, and vice versa. Conversely, TOC 210B moves onto the display as parent 200B moves onto the display, and vice versa. As an example of applying attributes of characteristics (such as presentation, interactions, etc.) in uniform way, connecting or locking of objects together may uniformly apply to a set of objects in hierarchy. For example, the locking of child TOCs 210A and 210B to their respective parent components 200A and 200B may also apply to any child TOCs for any digital book opened in the reader UI application. While the above examples illustrate connecting or locking particular UI components in the context of a reader UI, this disclosure contemplates locking or connecting any suitable UI components in any suitable application. For example, UI components of a social-networking web page, such as a timeline of user posts, may be connected for purposes of navigation or display. Moving some of the user posts in the timeline off the display may simultaneously move other user posts in the timeline onto the display, or hiding a particular post from a particular user may hide all posts by that user.

In particular embodiments, each page 220 of FIG. 2A may be displayed as a UI component floating on an imaginary or metaphorical "strip" of paper such as TOC strip 210. As another example, image 230 appears to "float" on top of its respective page 220 by slightly extending beyond the boundary of the page. While the above example relates to components in a reader UI, this disclosure contemplates extension of the floating-object concept to any collection of content organized in a hierarchical structure, such as any suitable hierarchy of UI components. Thus, in particular embodiments a photo album having a hierarchical structure may be rendered as a parent-object strip containing floating child-object photo thumbnails for each photo contained in the album. As another example, a user profile or timeline on a web page may be represented as an infinite imaginary parent-object strip of paper containing a plurality of floating child-object thumbnails representing photo albums, applications, events, etc., with each child-object thumbnail possibly containing its own child objects. In particular embodiments, floating objects may be rendered on a distinct layer of the hierarchy with the floating object(s) obscuring or blocking portions of the UI objects they overlap. In particular embodiments, floating UI components may be rendered at varying degrees of opacity or transparency.

Figure 4A:
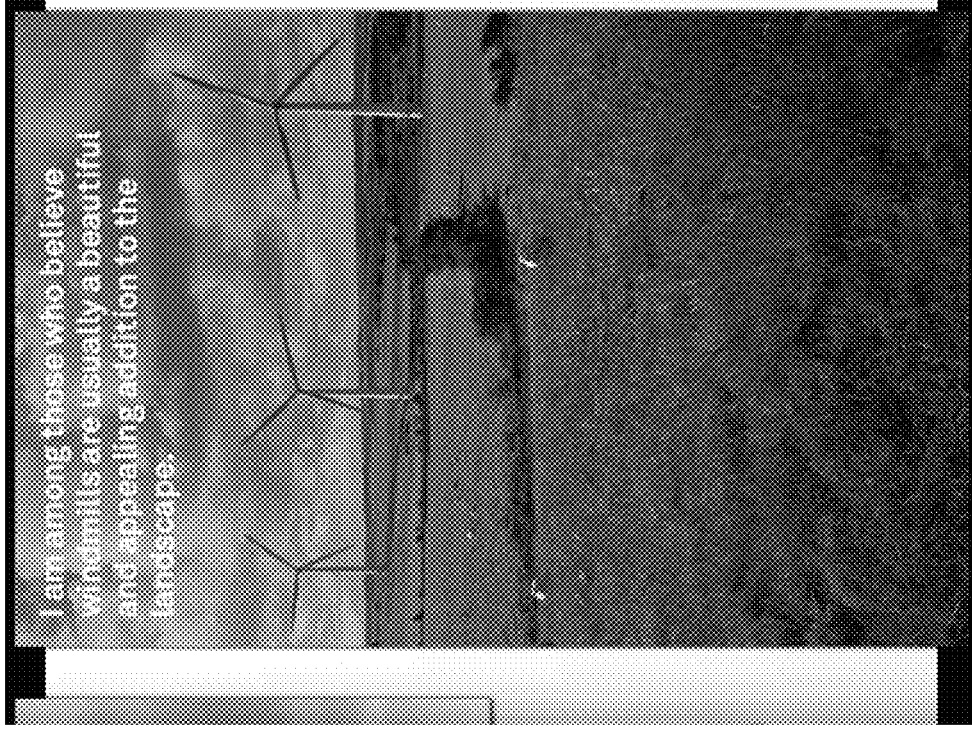
FIGS. 4A-D and FIG. 5 illustrate example interactions with a floating UI component.
Figure 4B:
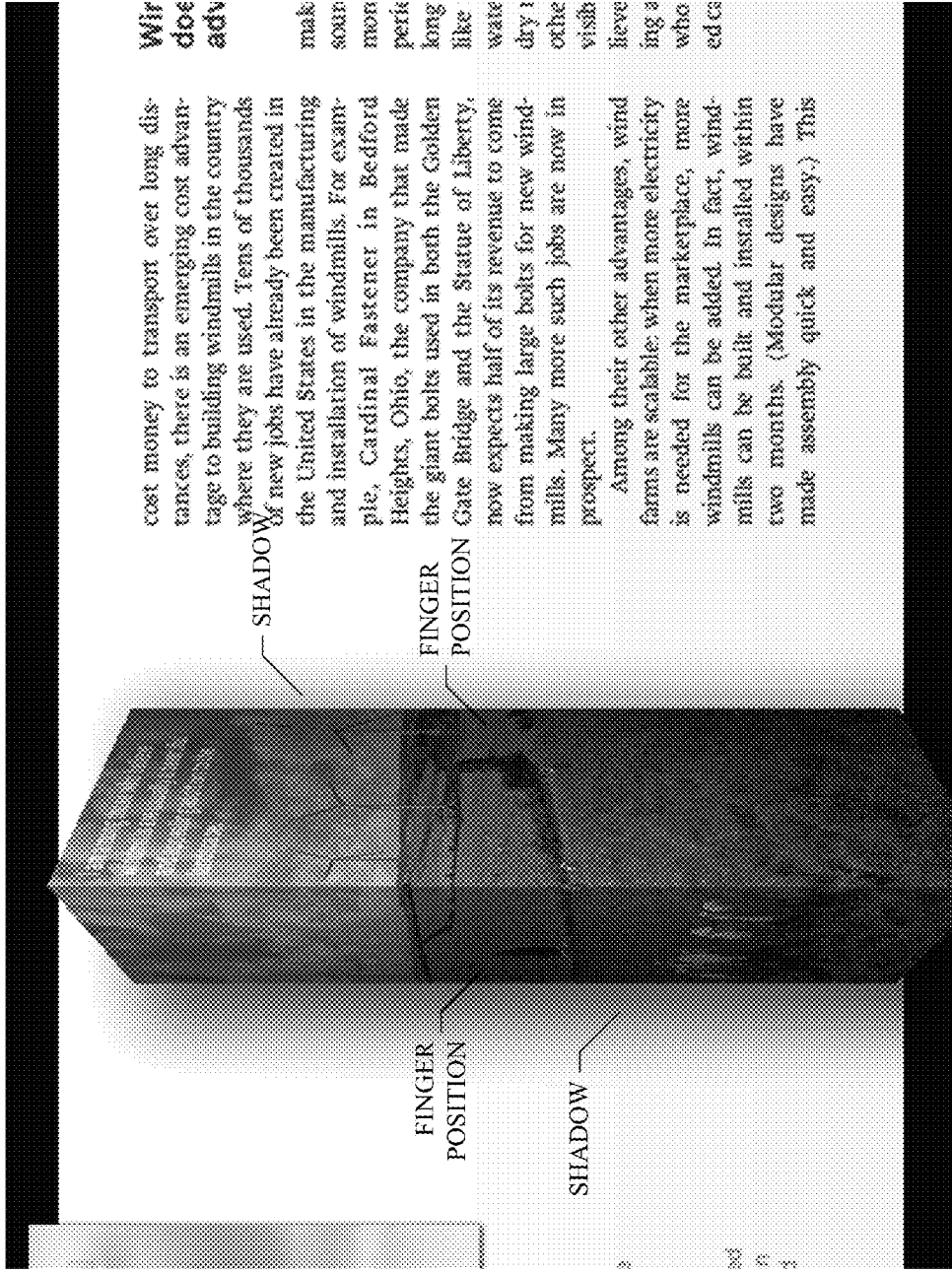
Figure 4C:
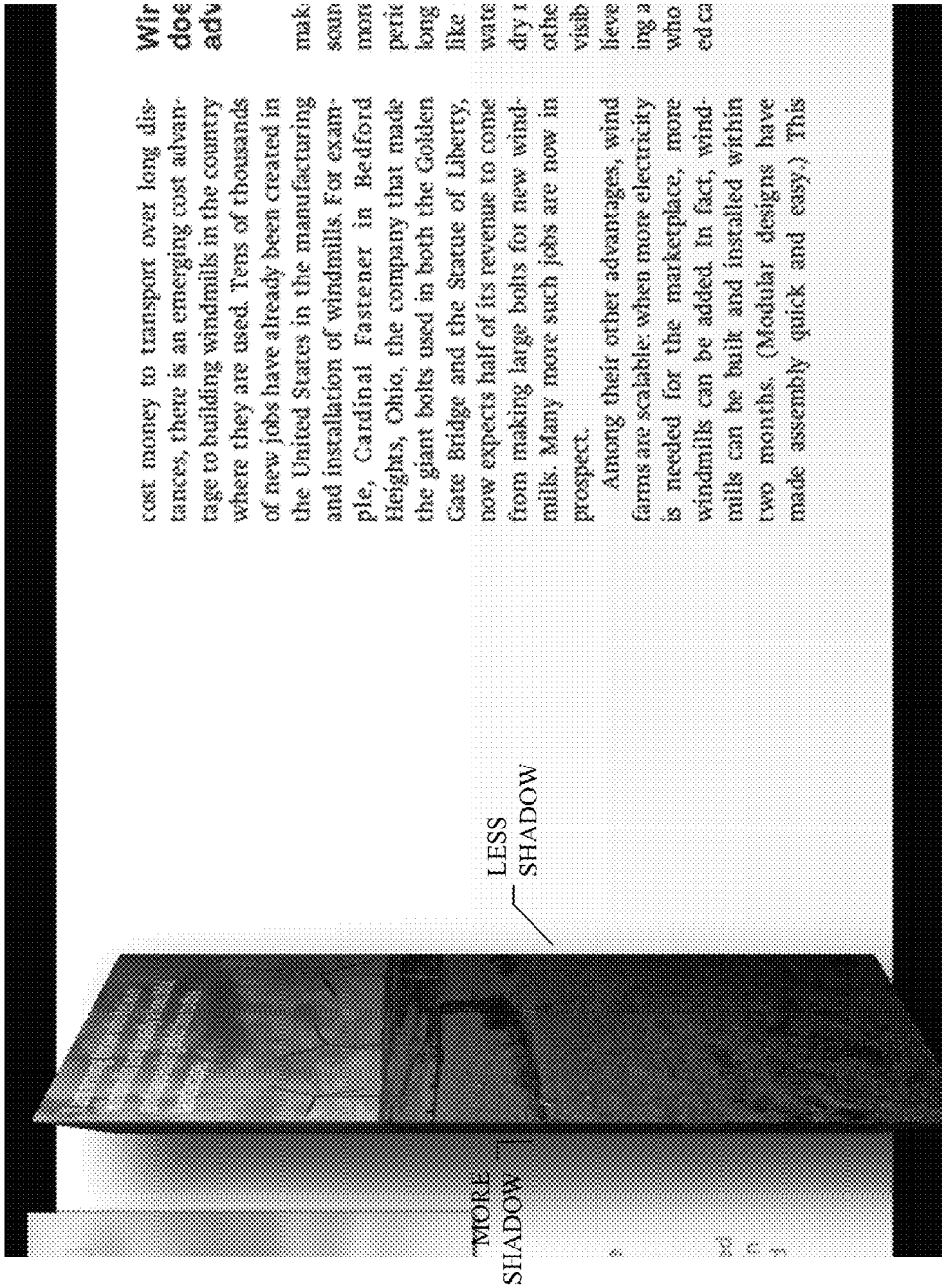
Figure 4D:
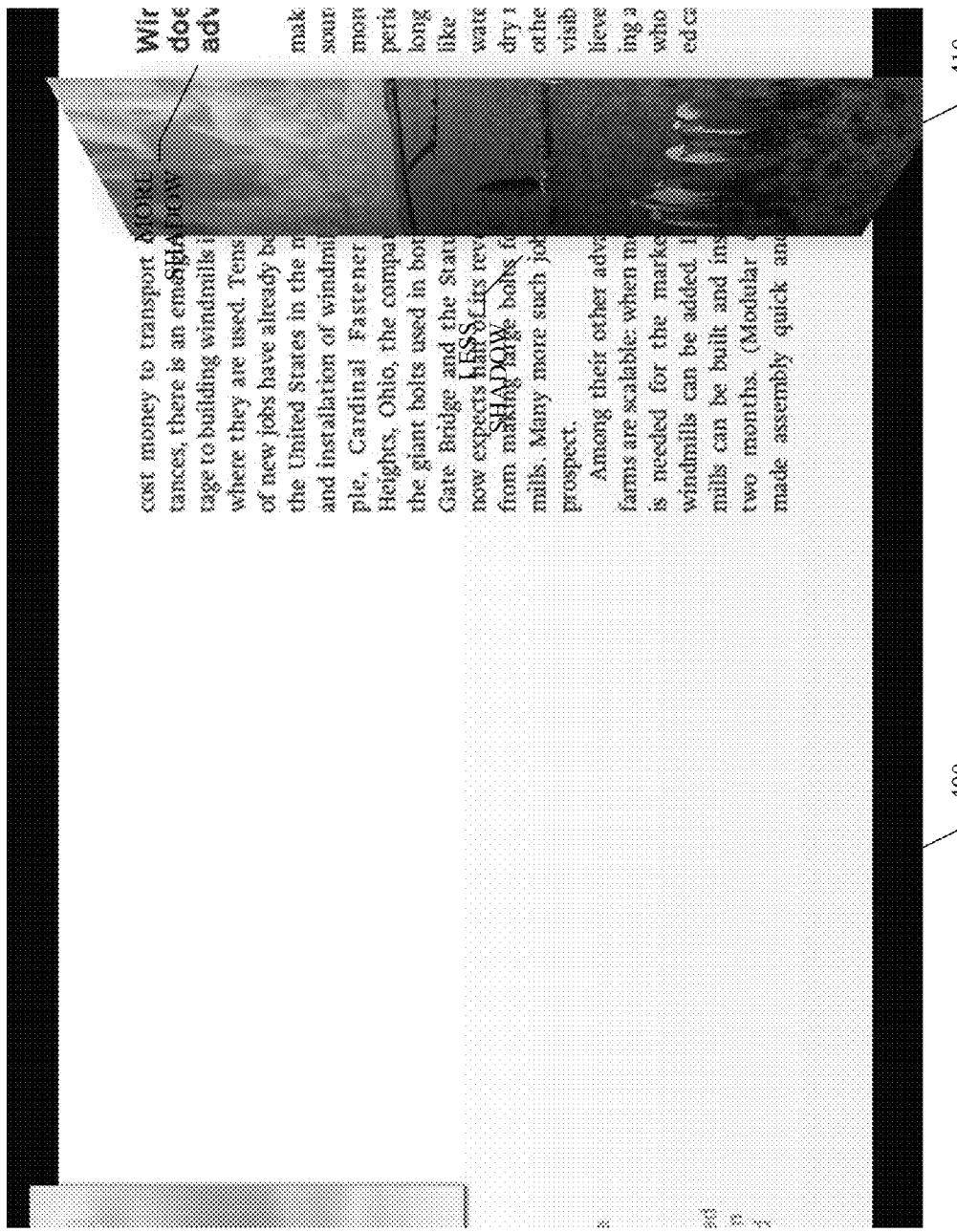
Figure 5:
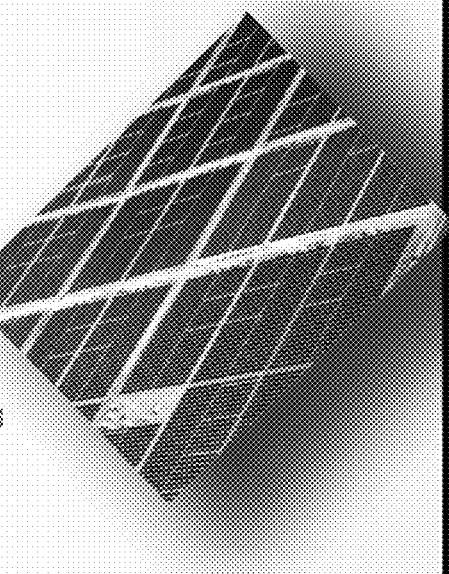

In particular embodiments, displaying an object as floating on top of another object is a visual indication that a user may interact with the floating object, by, for example, resizing, opening, moving, initiating animation or other graphical embellishments, etc. In other words, displaying on object as floating on top of another object is an attribute that uniformly indicates to a user a set of interactions are available for the floating objects. In particular embodiments, a floating object may by a UI component that may be manipulated by the user in various manners. TOC area 310 illustrated in FIGS. 3A and 3B and discussed above is one example of a floating UI component that may be manipulated by a user. As another example, a page 400 illustrated in FIGS. 4A-D includes an image 410 floating on top of page 400. Here, image 410 is displayed as a floating object, and only half of the entire image (e.g., a cropped version) is actually shown. A user may "lift" image 410 up and off page 400 by pinching image 410 up with two fingers, as illustrated in FIG. 4B. The two fingers may be placed anywhere near one or more edges of image 410. When image 410 is pinched up and off the page, the entire image appears, but folded at an angle relative to the distance between the two fingers the user used to pinch the image. In particular embodiments, if the user pinches out beyond a predetermined threshold distance and then takes his fingers off the image, the image expands to fill the entire screen. When a floating object is pinched up or selected, it may be moved to different positions on the screen, as illustrated in FIGS. 4C and 4D. It may also be rotated, as illustrated in FIG. 5. Here, an image 510 included in a page 500 has been pinched up (e.g., using two fingers) and rotated (e.g., by rotating the fingers pinching image 510). The shadows around image 510 rotate with image 510 accordingly to maintain the three-dimensional effect. In addition, as illustrated in FIG. 5, a portion of image 510 overlays the text behind it on page 500. In particular embodiments, when a floating UI component overlays some text behind it, the appearance of the text may be adjusted to simulate the effect of the shadow casted by the object on the text, for example by slightly darkening or distorting the text. In particular embodiments, floating UI components may be manipulated or interacted with just like any other UI component, for example by moving or resizing the floating component. In particular embodiments, as a user scrolls through floating UI components displayed next to each other, the visible edge of the scrolled object may be pushed over on top of the adjacent edge of the previous or next object, with shading or other suitable graphical embellishments. While the above example relates to a reader UI, this disclose applies to any suitable floating UI component in any suitable context. As an example and not by way of limitation, a web page may display a user profile or timeline containing a plurality of floating child-object thumbnails representing photo albums, applications, events, status updates, likes, etc. The above discussion relating to display and manipulation applies to the floating objects on the web page, and any other suitable floating objects.

Figure 6A:
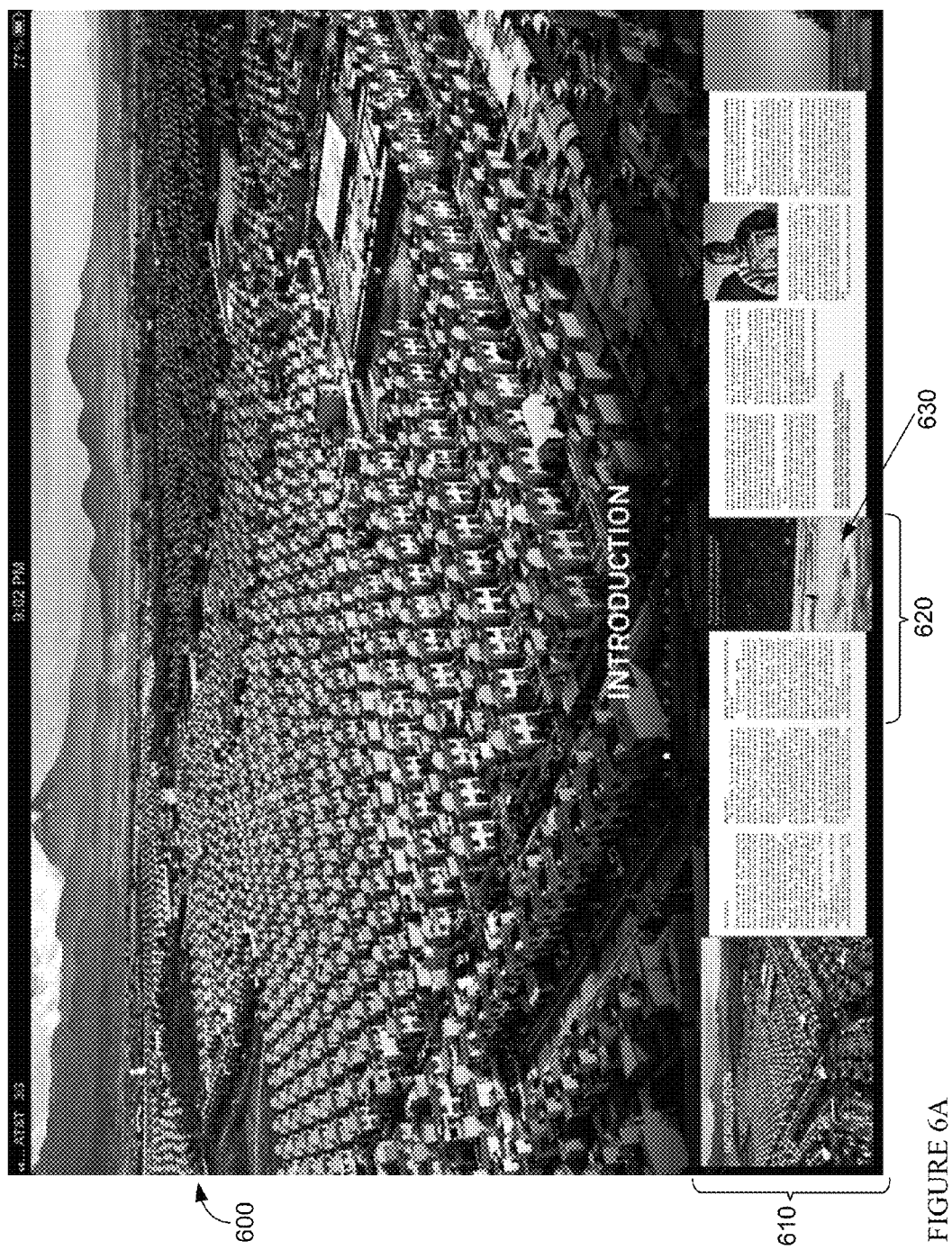
FIGS. 6A-C and FIG. 7 illustrate: 1) UI components having multiple states; and 2) example navigations among hierarchical layers.
Figure 6B:
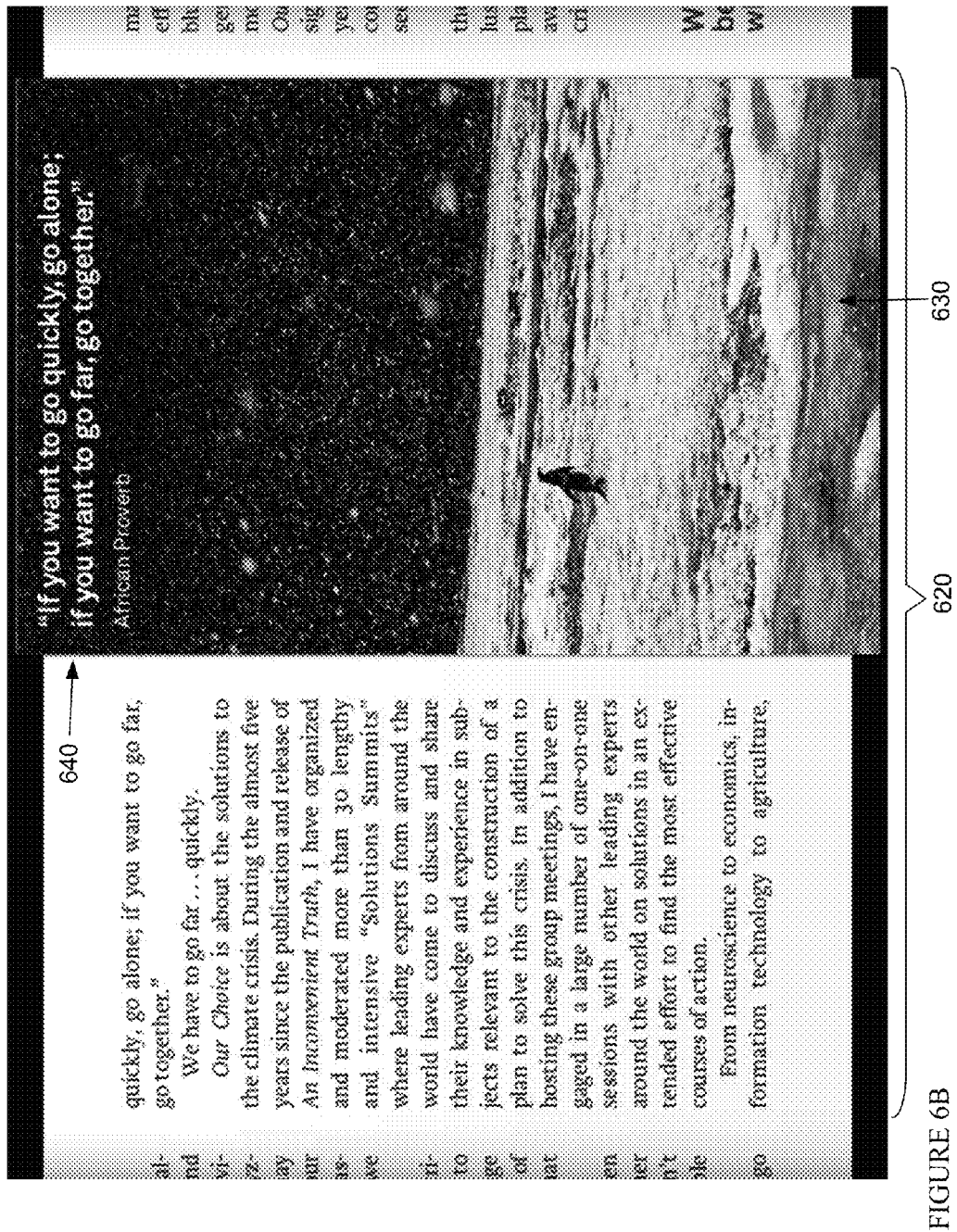
Figure 6C:
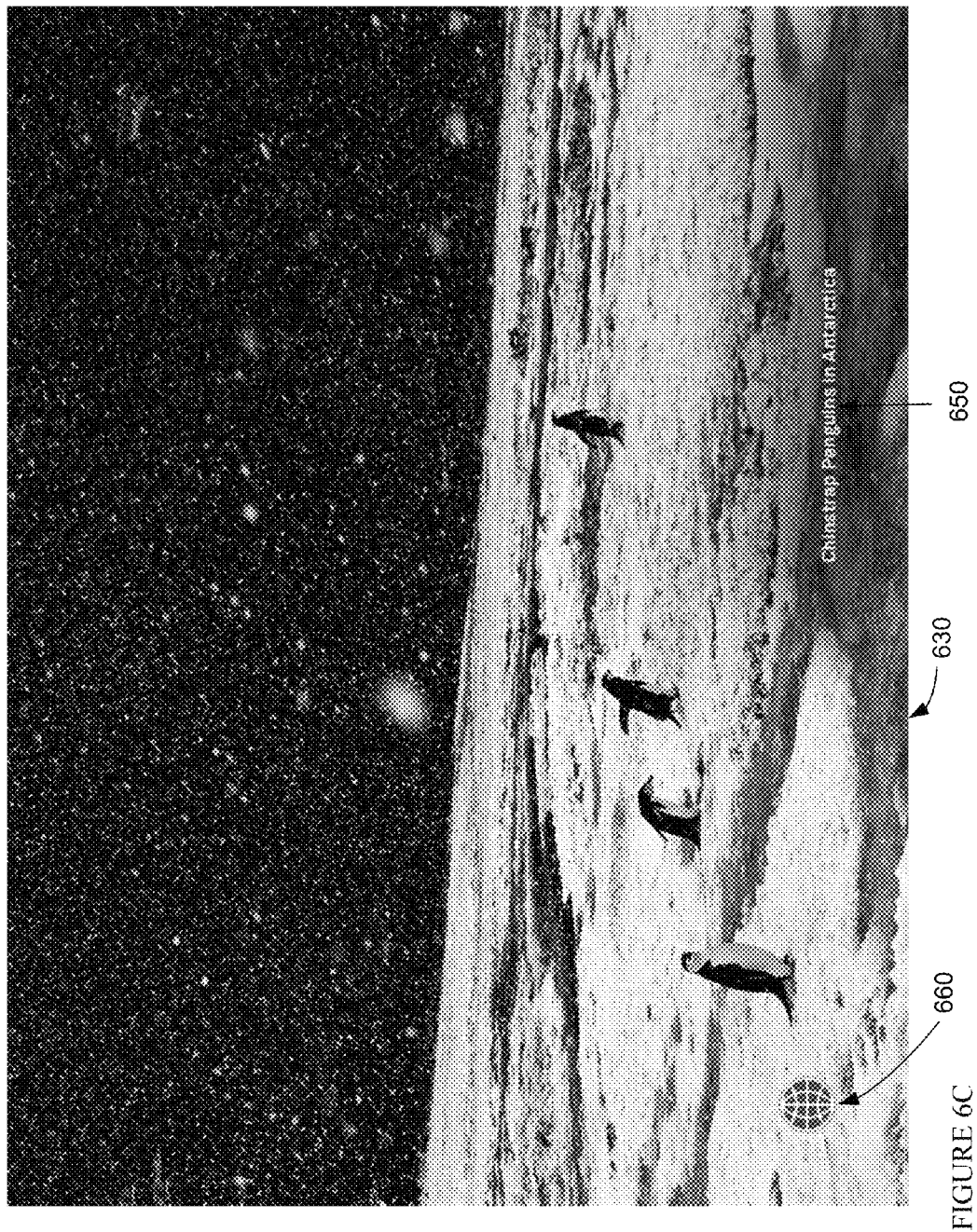
Figure 7:
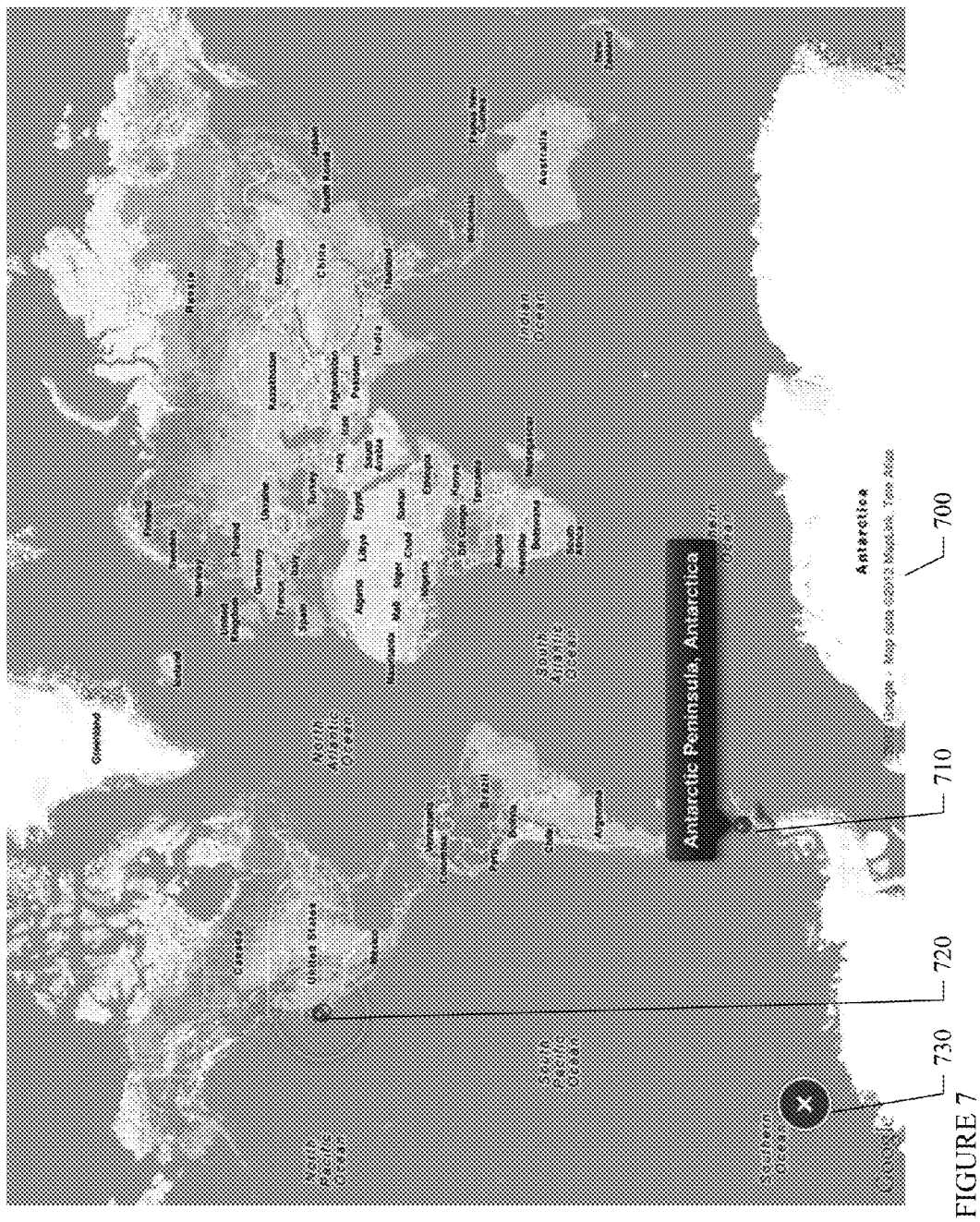

As briefly described above in FIG. 4A-D, an image that is initially displayed in partial-screen mode may be pinched open to full-screen mode. In general, any object may have two or more states. In particular embodiments, each "version" of an object corresponding to the particular state the object is in may be an independent object in the hierarchy. In particular embodiments, any UI component may have two or more states, for example, two or more display modes. In particular embodiments, a UI component such as an image may have multiple cropped versions in addition to the full-size image. The cropped versions may be shown in different situations and depend on the view or mode. For example, a UI component's states may include a full-screen state, an in-page state, and a TOC state or thumbnail state. In the full-screen state, the UI component occupies all or almost all of the entire display of the electronic device, as illustrated by image 630 in FIG. 6C. In the TOC state, image 630 in FIG. 6A is displayed within a portion of the device's display. A third state for image 630 is displayed in FIG. 6B. It differs from full-screen image 630 in FIG. 6C in several aspects. First, in full-screen mode, image 630 shows the entire image, while FIG. 6B only shows a portion (i.e., a cropped version) of image 630. Image 630 in FIG. 6C has a caption 650 that differs from caption 640 included image 630 of FIG. 6B. In full-screen mode there is an icon 660 on image 630 that represents a geo-location tag. When a user interacts with (for example, by single tapping) icon 660, the underlying geo-location tag causes a map 700 to be displayed, as illustrated in FIG. 7. Map 700 includes an indicator 710 indicating the geographical location of the subject matter in image 630 and another indicator 720 indicating, if known and enabled by the user and user's device, the current geographical location of the user and the electronic device displaying the digital book. In addition, there is an icon 730 that enables the user to close the map and return to the previous page, here image 630 in FIG. 6C.

A UI component may transition between its various states in response to a user input. For example, a user may single tap, double tap, or pinch open a cropped version an image to transition to the full-page view. In particular embodiments, immediately after the transition to full-screen view the image may initially still be shown with the features of the cropped version. The display may gradually zoom in or out on the image until eventually the complete image is shown. In particular embodiments, the user interface may interpret zooming out (i.e., pinching) an object beyond a predetermined amount as an indication that the user wishes to close the object and return to the previous hierarchical level. In the example described above, in full-screen mode map 700 may display the entire globe. A user zooming out on the map such that the map no longer takes up a predetermined amount of the display (e.g., 50%) may be interpreted as an indication that the user wishes to close map 700 and return to the previous page, here image 630 in FIG. 6C. While the disclosure above describe particular types of states and transitions between states of UI components in the context of a reader UI, this disclosure contemplates any suitable number of states and transitions between states for any suitable set of UI components in any suitable context. In addition, as described in the examples above, any suitable UI components may have unique behaviors or properties in any of its states.

As discussed above, interactions between a user and hierarchical UI components may include transitioning one or more UI components among various pre-determined states. In particular embodiments, another set of interactions between a user and one or more hierarchical UI components includes navigating among the various components and layers of components in the hierarchy. In particular embodiments, a user may navigate among UI components existing on a given layer of the hierarchy. In particular embodiments, a user may navigate among different layers of UI components in the hierarchy. In each case, the navigation follows the structure of the hierarchy, and the relationships indicated by the hierarchical structure are maintained throughout the navigation. For example, the hierarchy automatically maintains the relationship between UI components such that if transitioning from one layer of the hierarchy to another, the transition is to the appropriate parent or child UI components of the transitioned-from level. As an example, if a user navigates from page 620 in FIG. 6B to the layer of the page's parent, the UI reader automatically navigates to parent section 600 illustrated in FIG. 6A. If the user were viewing page 620 and then navigated to a page having a different parent, a navigation to the parent layer would cause the display to transition to the parent of the navigated-to page. In this way, the book-reader UI automatically maintains and displays the relationship among objects while a user navigates through the hierarchy. As illustrated throughout this disclosure, in particular embodiments the navigation operations and the graphical representation of the navigations may be uniform for a set of hierarchical UI components. For example, if a swiping operation provides for navigation among UI components at one layer of the hierarchy, the same swiping motion may provide for navigation among UI components at any layer of the hierarchy.

Any suitable input may be used to accomplish a navigation interaction. Navigation inputs may include gestures performed on a touch-sensitive display of a device, and may include input from a peripheral such as a computer mouse, trackball, keyboard, etc. Navigation gestures performed on a touch-sensitive display may include swiping one or more fingers across the display, pinching together or separating a plurality of fingers placed on the display, single or double tapping one or more fingers on the display, or any other suitable gesture. Navigation input from a peripheral may include single or double clicking a UI component or navigation icon, scrolling a trackball or wheel, any suitable combinations of movement and clicks select portions on the display with a cursor, pressing one or more keys on a keyboard, or any other suitable input. The characteristics of navigation operations and the graphical display of navigation among hierarchical UI components and layers is described more fully, below.

In particular embodiments, navigation among UI components or layers of a hierarchy may be accomplished by scrolling. Scrolling may be achieved by any of the inputs or interactions described above. As an example, scrolling may be accomplished by a navigation operation such as a swiping gesture performed by one or more fingers on a touch-sensitive display of a device. Swiping may move the object in the same direction as the swipe (e.g., swiping from right to left moves the swiped object towards left, and swiping from top to bottom moves the swiped object downward). Swiping may also move the swiped object in the opposite direction of the swipe. Swiping in the horizontal direction may scroll among objects at one level. For example, swiping from right to left moves to the object existing immediately to the right of the object swiped, and swiping from left to right moves to the object existing immediately to the left of the object swiped. Similarly, swiping in the vertical direction may navigate between different levels or layers of objects. In particular embodiments, a "scrubber" (such as scrubber 240 illustrated in FIG. 2A) corresponds to individual objects, groups of objects, or portions of a hierarchy. For example, in the reader UI of FIG. 2A each dot in scrubber 240 corresponds to a specific section or chapter of the digital book. In this example, user may navigate to the various sections or chapters of the book by sliding across scrubber 240 or tapping on a specific dot with a finger. In general, a scrubber may be used to navigate among any suitable UI components in any suitable context.

At any given time, a device may display one or more UI components at a first layer of the hierarchy. A navigation operation may transition the display from one or more UI components on the first layer to one or more UI components on a second layer. The user may transition between levels in a hierarchy by performing any suitable transition operation. For example, a user may single or double tap a UI component displayed on a touch-sensitive device, resulting in a transition of the UI component, and possibly one or more of its siblings, to a full-screen or primary display. As discussed above, in particular embodiments each state of an object (such as full-screen mode and partial-screen modes) is itself an object in the hierarchy As another example, gestures such as "pinching" and "pinching open" (also referred to as "reverse pinching" or "zooming") may resize one or more UI components, and at a predetermined level of magnification (e.g., when the object occupies 50% of the available display) the zoom-in gesture results in a transition to full-screen display of the object or objects being magnified. Likewise, at some level of minimization, the UI components may transition to a small-screen display. Gestures accomplishing zooming and reverse pinching generally involve registering two sensor inputs on the input surface (generally a capacitive or resistive touch sensor, though this disclosure contemplates camera-based sensors as well) at locations corresponding to the graphical render of a particular UI component, followed by one or more continuous sliding or motion inputs. This operation may be most easily visualized as "squeezing" an object on a display surface between two digits in reverse. Such a "zoom" or "reverse pinch" operation may, in particular embodiments, expand the UI component to a predetermined size, such as a full screen view, or to a predefined state, as discussed above. For example, placing two fingers at the positions shown in FIG. 3B and pinching the fingers together results in minimization of TOC UI component 310, as shown in FIG. 3A. As another example of a navigation operation that transitions between layers of UI components, when a user reaches the last child object of a parent object and performs a navigation operation that navigates through child objects, the display may transition to the parent-object level. As an example, when the user reaches the last photo of a photo album and performs a navigation that would otherwise navigate to the subsequent photo, the display may transition to the photo album layer. The transition may be to the parent object of the child just navigated from or the parent object of the next child object in the hierarchy. A user may navigate to the root UI component or layer in the hierarchy, which may be a desktop or home screen of a device.

FIGS. 6A, B, and C illustrate the effect of a navigation operation in the example of a reader UI. In FIG. 6A, page 600 is the parent UI component of floating TOC strip 610, which itself contains child UI components such as page 620. Page 620 may contain one or more children, such as image 630, which may itself contain children. When a user performs a transition operation on a particular page in strip 610, the display may transition the page to full-screen mode, as illustrated in FIG. 6B. Performing another transition operation on child image 630 in FIG. 6B may transition the display to the full-screen state of image 630, as illustrated in FIG. 6C. A user may perform the same or another navigation operation to navigate to lower layers of the hierarchy, e.g., from image 630's full-screen state in FIG. 6C to it's parent page 620's full-screen state in FIG. 6B. While the disclosure above describes transitions among particular UI components at particular layers in the context of a UI reader, this disclosure contemplates transitioning between any suitable layer in any suitable UI, such as a social networking website, software application, or a UI of a desktop computer or mobile device.

In particular embodiments, a navigation operation may navigate among objects at the same level of a hierarchy. As an example, UI components may be arranged in a hierarchy and displayed on a device, and a user of the device may navigate from one or more UI components to one or more other UI components on the same layer of the hierarchy. As described above, in particular embodiments a navigation operation may result from input provided to the device via a peripheral, such as moving or clicking a mouse to manipulate a graphically-generated cursor. In particular embodiments, the navigation operation may be accomplished by contact with a touch-sensitive display of a device, such as one or more gestures performed on the display.

Figure 8A:
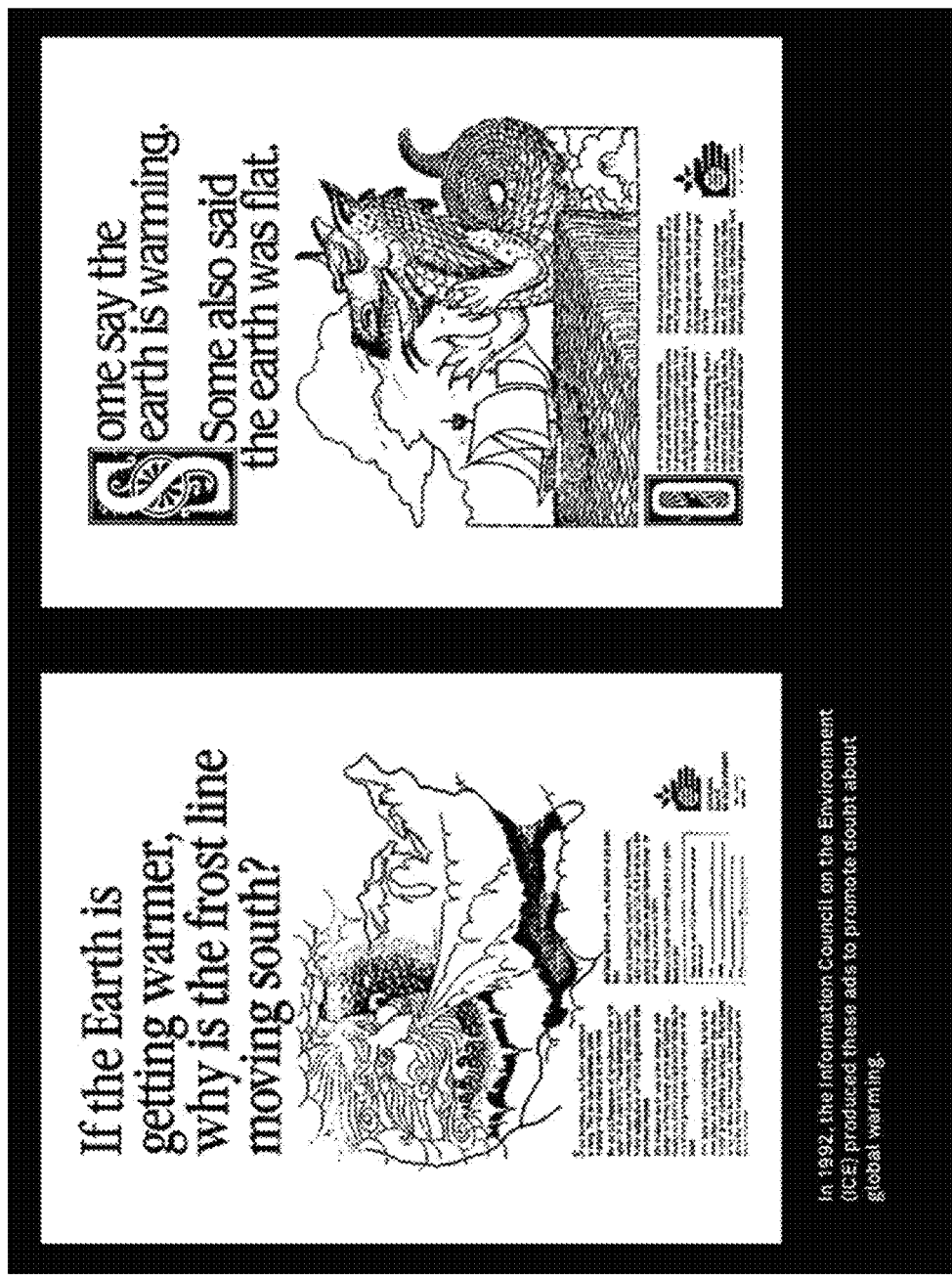
FIGS. 8A-C illustrate scrolling through UI components.
Figure 8B:
Figure 8C:
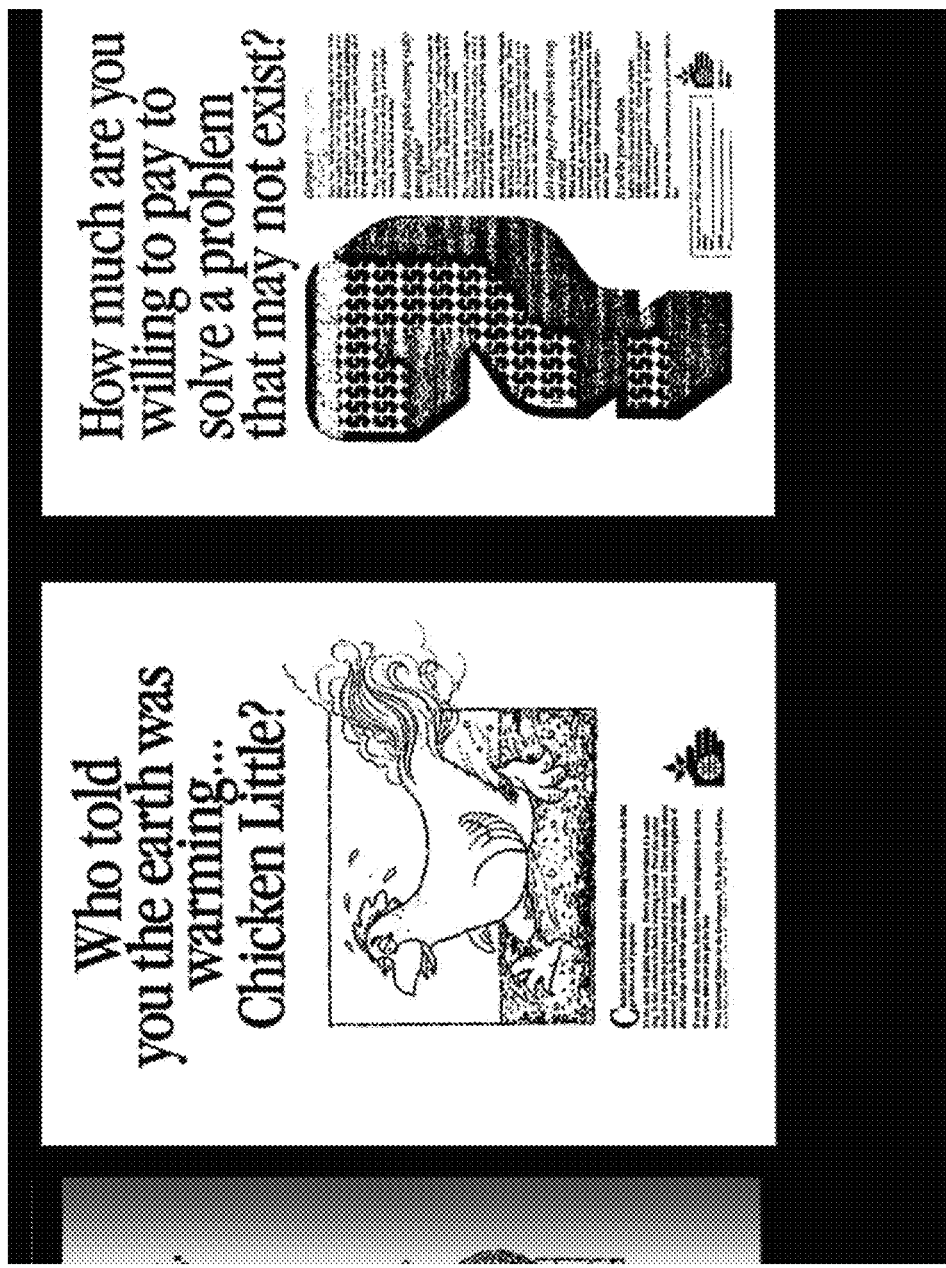

FIGS. 8A-C illustrate an example of scrolling among hierarchical UI components at a given layer in the context of a reader UI. In FIG. 8A, page 810 is the current page displayed on a device and is shown in full-screen mode. By sliding a finger in the left direction across the screen, page 810 recedes from view and the adjacent page 820 simultaneously and seamlessly scrolls into view, as illustrated in FIG. 8B. In particular embodiments, when receding or moving onto the display UI components may have one or more different attributes than UI components that are entirely or mostly on the display. As an example, in FIG. 8B page 820 is slightly smaller in size than that of page 810. When a pre-determined amount (e.g., 50%) of page 820 has moved onto the display page 820 takes the usual size of a page in the reader UI, as illustrated in FIG. 8C. Page 820 continues to scroll onto the display as page 810 scrolls off the display, as illustrated in FIG. 8C. In particular embodiments, scrolling may be paused or halted at any point during the navigation. For example, a user who scrolls between pages by swiping a finger across the display may interrupt the scrolling and "freeze" the display in place by interrupting the swiping motion and holding their finger in place. While the above example relates to scrolling specific UI components in the context of a reader UI, this disclosure contemplates that the concepts and features described above may be applied to any suitable navigation among any suitable UI components in any suitable context.

As described above and illustrated in FIGS. 2A and 2B, groups of objects may be connected or locked together in a particular way or for a particular purpose. In the example of FIG. 2A, a section 200 may be displayed with its child objects (e.g., pages 220) in a TOC area 210. Section 200 and it child TOC area 210 are connected for the purposes of navigation and display. For example, if a user scrolls at either the parent or child layer, the other layer scrolls as appropriate to maintain the proper display of the relationships in the hierarchy. In other words, if a user scrolls TOC strip 210 until the pages 220 contained in the TOC strip 210 are no longer child UI components of section 200, section 200 will scroll off the screen with its children and the next section will scroll onto the screen with its children. This is illustrated in FIG. 2B, where TOC 210A has reached the end of its UI components, and thus parent section 200A is scrolled off the display while parent section 200B of TOC 210B is scrolled onto the display. Likewise, if a user scrolls at section level 200A or 200B, strip 210A and 210B, respectively, will also scroll as appropriate. In particular embodiments, connected objects scroll in synchronization with each other. In FIG. 2B, the last few pages of TOC strip 210A of the gradually move left out of view and the first few pages of TOC strip 210B gradually move left into view. At the point of transition 250 between the two components, the receding edge of both TOC area 210A and its parent section 200A line up with the respective incoming edges of TOC area 210B and its parent section 200B. The transition between a current section and a section immediately before the current section behaves similarly, with the exception that instead of moving in the left direction across the screen of the electronic device, objects move in the right direction.

In order to maintain the proper display of relationships of the hierarchical UI components, the layers may scroll at different speeds. For example, if a user scrolls at the parent section layer, and there are many child objects contained in the child TOC area, the child objects will have to scroll somewhat faster in order to reach the appropriate child objects of the next parent section and bring them on to the display with their parent. Likewise, multiple child objects may be scrolled while the parent object remains approximately stationary, indicating the various child objects scrolled through are all child objects of the displayed parent object. While the above disclosure describes attributes of connecting reader UI components for the purposes of scrolling, this disclosure contemplates application of the same attributes to any suitable set of connected UI components, for example, in the context of a social-networking website or software application. In the social-networking context, a parent object may be a "wall" capable of hosting user-created content and the child objects may be the user-created content, including links, videos, pictures, etc. the content contains. The child objects may be organized in any suitable orientation and according to any suitable metric, such as time posted or user posted by. As another example, the parent object may be an application such as a chat or music-playing application, and the child objects may be the users within the chat application or individual songs or playlists within the music playing application. In particular embodiments, a user may preselect a portion of objects to be displayed. In addition or alternatively, a user may determine specific rules governing the selection of a portion of objects to be simultaneously displayed. For example, a user may choose to simultaneously display all content posted to a user's profile page by a specific user or group, or all pictures in a given photo album. The above discussion of scrolling and locking may apply to any suitable set of simultaneously displayed or connected UI components in any suitable context.

Figure 9:
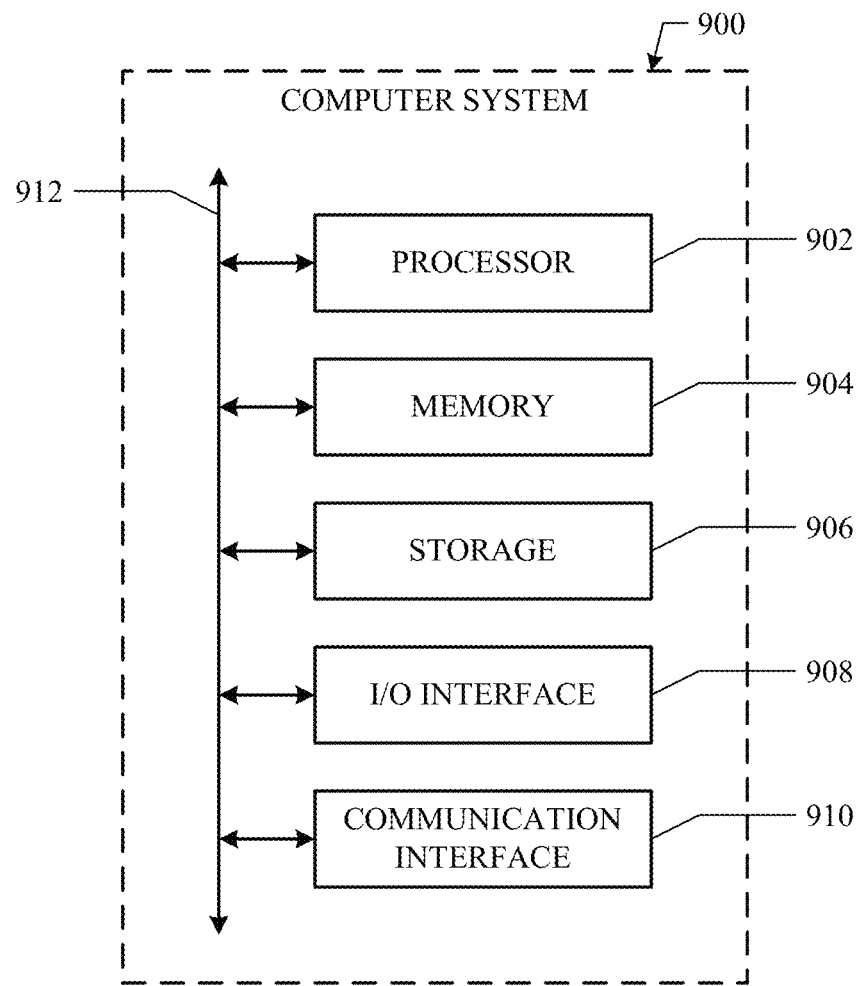
FIG. 9 illustrates an example electronic device.

Particular embodiments may be implemented on one or more electronic devices or computer systems. FIG. 9 illustrates an example electronic device 900. For example, computer system 900 may be an embodiment for a desktop computer, laptop computer, tablet computer, personal digital assistant (PDA), smartphone, satellite navigation device, portable media player, portable game console, kiosk computer, point-of-sale device, or other suitable device. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, providing for display to a user a user interface that comprises a plurality of components arranged in a hierarchy, wherein:
the hierarchy comprises a first layer and a second layer;
each of the first and second layers comprises at least one of the components;
each component in the first layer has at least one child in the second layer;
each component in the second layer has one parent in the first layer; and
in a first-layer state of the user interface:
components in the second layer are displayed thumbnails in a strip across a length of the user interface that is parallel or perpendicular to a scroll direction of the first layer; and
the strip appears to overlay a visual plane that components in the first layer are displayed in, the parent components in the first layer being larger in size than corresponding ones of the thumbnails in the second layer;
when a particular component in the second layer is displayed as a thumbnail in the strip, the component in the first layer that is the parent of the particular component in the second layer is concurrently displayed in the visual plane that the strip appears to overlay;
by one or more computing devices, when the user interface is in the first-layer state and the user interacts with the user interface to scroll from a first one of the components in the first layer to a second one of the components in the first layer, automatically causing the second layer to scroll synchronously with the first layer from components in the second layer that are children of the first one of the components in the first layer to components in the second layer that are children of the second one of the components in the first layer and a last one of the first components in the first layer and a first one of the second one of the components in the first layer share a common aligned transition line with a last one of the components in the second layer that are children of the first one of the components in the first layer and a first one of the components in the second layer that are children of the second one of the components in the first layer, the first component in the first layer following the second component in the first layer in the hierarchy.

2. The method of claim 1, wherein the user interface presents a digital book.

3. The method of claim 2, wherein components in the first layer of the user interface represent chapters of the digital book and components in the second layer of the user interface represent pages within the chapters of the digital book.

4. The method of claim 1, wherein the user interface presents one or more portions of a social-networking website.

5. The method of claim 4, wherein components in the first layer of the user interface represent content sections of the social-networking website and components in the second layer of the user interface represent content items within the content sections.

6. The method of claim 1, further comprising, by one or more computing devices, when the user interface is in the first-layer state and the user interacts with the user interface to scroll from components in the second layer that are children of a third one of the components in the first layer to components in the second layer that are children of a fourth one of the components the first layer, automatically causing the first layer to scroll synchronously with the second layer from the third one of the components in the first layer to the fourth one of the components the first layer.

7. The method of claim 1, wherein the user interaction comprises the user contacting the first one of the components in the first layer displayed on a touch-sensitive display of a device with one or more fingers and moving the fingers to scroll to the second one of the components in the first layer.

8. One or more computer-readable non-transitory storage media embodying logic that is operable when executed to:
provide for display to a user a user interface that comprises a plurality of components arranged in a hierarchy, wherein:
the hierarchy comprises a first layer and a second layer;
each of the first and second layers comprises at least one of the components;
each component in the first layer has at least one child in the second layer;
each component in the second layer has one parent in the first layer; and
in a first-layer state of the user interface:
components in the second layer are displayed as thumbnails in a strip across a length of the user interface that is parallel or perpendicular to a scroll direction of the first layer; and
the strip appears to overlay a visual plane that components in the first layer are displayed in, the parent components in the first layer being larger in size than corresponding ones of the thumbnails in the second layer;
when a particular component in the second layer is displayed as a thumbnail in the strip, the component in the first layer that is the parent of the particular component in the second layer is concurrently displayed in the visual plane that the strip appears to overlay;
when the user interface is in the first-layer state and the user interacts with the user interface to scroll from a first one of the components in the first layer to a second one of the components in the first layer, automatically cause the second layer to scroll synchronously with the first layer from components in the second layer that are children of the first one of the components in the first layer to components in the second layer that are children of the second one of the components in the first layer and a last one of the first components in the first layer and a first one of the second one of the components in the first layer share a common aligned transition line with a last one of the components in the second layer that are children of the first one of the components in the first layer and a first one of the components in the second layer that are children of the second one of the components in the first layer, the first component in the first layer following the second component in the first layer in the hierarchy.

9. The media of claim 8, wherein the user interface presents a digital book.

10. The media of claim 9, wherein components in the first layer of the user interface represent chapters of the digital book and components in the second layer of the user interface represent pages within the chapters of the digital book.

11. The media of claim 8, wherein the user interface presents one or more portions of a social-networking website.

12. The media of claim 11, wherein components in the first layer of the user interface represent content sections of the social-networking website and components in the second layer of the user interface represent content items within the content sections.

13. The media of claim 8, wherein the logic is further operable to, when the user interface is in the first-layer state and the user interacts with the user interface to scroll from components in the second layer that are children of a third one of the components in the first layer to components in the second layer that are children of a fourth one of the components the first layer, automatically cause the first layer to scroll synchronously with the second layer from the third one of the components in the first layer to the fourth one of the components the first layer.

14. The media of claim 8, wherein the user interaction comprises the user contacting the first one of the components in the first layer displayed on a touch-sensitive display of a device with one or more fingers and moving the fingers to scroll to the second one of the components in the first layer.

15. A system comprising:
a memory comprising instructions executable by one or more processors; and
the one or more processors coupled to the memory and operable to execute the instructions, the one or more processors being operable when executing the instructions to:
provide for display to a user a user interface that comprises a plurality of components arranged in a hierarchy, wherein:
the hierarchy comprises a first layer and a second layer;
each of the first and second layers comprises at least one of the components;
each component in the first layer has at least one child in the second layer;
each component in the second layer has one parent in the first layer; and
in a first-layer state of the user interface:
components in the second layer are displayed thumbnails in a strip across a length of the user interface that is parallel or perpendicular to a scroll direction of the first layer; and
the strip appears to overlay a visual plane that components in the first layer are displayed in, the parent components in the first layer being larger in size than corresponding ones of the thumbnails in the second layer;
when a particular component in the second layer is displayed as a thumbnail in the strip, the component in the first layer that is the parent of the particular component in the second layer is concurrently displayed in the visual plane that the strip appears to overlay; and
when the user interface is in the first-layer state and the user interacts with the user interface to scroll from a first one of the components in the first layer to a second one of the components in the first layer, automatically cause the second layer to scroll synchronously with the first layer from components in the second layer that are children of the first one of the components in the first layer to components in the second layer that are children of the second one of the components in the first layer and a last one of the first components in the first layer and a first one of the second one of the components in the first layer share a common aligned transition line with a last one of the components in the second layer that are children of the first one of the components in the first layer and a first one of the components in the second layer that are children of the second one of the components in the first layer, the first component in the first layer following the second component in the first layer in the hierarchy.

16. The system of claim 15, wherein the user interface presents a digital book.

17. The system of claim 16, wherein components in the first layer of the user interface represent chapters of the digital book and components in the second layer of the user interface represent pages within the chapters of the digital book.

18. The system of claim 15, wherein the user interface presents one or more portions of a social-networking website.

19. The system of claim 15, wherein the processors are further operable when executing the instructions to, when the user interface is in the first-layer state and the user interacts with the user interface to scroll from components in the second layer that are children of a third one of the components in the first layer to components in the second layer that are children of a fourth one of the components the first layer, automatically cause the first layer to scroll synchronously with the second layer from the third one of the components in the first layer to the fourth one of the components the first layer.

20. The system of claim 15, wherein the user interaction comprises the user contacting the first one of the components in the first layer displayed on a touch-sensitive display of a device with one or more fingers and moving the fingers to scroll to the second one of the components in the first layer.

* * * * *